United States Patent [19]
Maruyama et al.

[11] Patent Number: 5,498,217
[45] Date of Patent: Mar. 12, 1996

[54] CONTROL METHOD OF VEHICLE ENGINE ARRANGED IN ASSOCIATION WITH FLUID COUPLING HAVING CLUTCH

[75] Inventors: Ikuo Maruyama, Kameoka; Yoshimasa Nagayoshi, Kyoto; Hisaji Nakamura, Kyoto; Akio Takada, Kyoto; Koichi Kato, Yokohama; Sadamu Oyaide, Okazaki; Tatsuya Shimazaki; Yoshihiro Konno, both of Kyoto, all of Japan

[73] Assignee: Mitsubishi Jidosha Kogyo Kabushiki Kaisha, Tokyo, Japan

[21] Appl. No.: 305,096

[22] Filed: Sep. 13, 1994

[30] Foreign Application Priority Data

Sep. 17, 1993 [JP] Japan .................................. 5-232011

[51] Int. Cl.$^6$ ................................................ B60F 41/02
[52] U.S. Cl. ........................................ 477/169; 477/181
[58] Field of Search ............................ 477/169, 175, 477/181

[56] References Cited

U.S. PATENT DOCUMENTS

| | | | |
|---|---|---|---|
| 5,085,301 | 2/1992 | Imamura et al. | 477/181 |
| 5,141,089 | 8/1992 | Nobumoto et al. | 477/181 |
| 5,385,517 | 1/1995 | Hara et al. | 477/181 |

Primary Examiner—Dirk Wright

[57] ABSTRACT

A control method is provided for an engine for a vehicle. The engine is arranged in association with a fluid coupling having a clutch. According to the control method, the state of engagement of the clutch is first detected. In the next step, it is determined whether or not the vehicle is in a predetermined decelerated operation state. When the clutch has been detected to be in a predetermined state of engagement in the clutch engagement state detection step and in addition, the vehicle has been determined to be in the predetermined decelerated operation state in the decelerated operation state determination step, an output of the engine is increased in the subsequent step.

7 Claims, 16 Drawing Sheets

CONTROL METHOD OF VEHICLE ENGINE ARRANGED IN ASSOCIATION WITH FLUID COUPLING HAVING CLUTCH

BACKGROUND OF THE INVENTION a) Field of the Invention

This invention relates to a control method for a vehicle engine arranged in association with a fluid coupling having a clutch, which is suited for use in controlling the engine at the time of a deceleration of the vehicle.

b) Description of the Related Art

Automatic transmissions equipped with a clutch (hereinafter called a "damper clutch") in their torque converters have been provided to date.

Such automatic transmissions are each provided with the torque converter connected to an engine, the damper clutch incorporated in the torque converter to permit solid connection of the torque converter between an inlet side and an outlet side thereof, and a control unit for the torque converter and the damper clutch.

The above control unit is constructed of non-slip connection control means for controlling the damper clutch in a solid connection state and non-direct connection range control means for controlling the damper clutch in a state not directly connected.

By operating the vehicle with the damper clutch directly connected by the non-slip direct connection control means under predetermined conditions, fluid frictional engagement in the torque converter can therefore be replaced by mechanical frictional engagement by the damper clutch so that the fuel consumption can be improved.

The non-slip direct connection control for the damper clutch is designed to be performed in the steady operation state that the throttle position is equal to or greater than a predetermined angle and the turbine speed of the torque converter is equal to or greater than a predetermined value.

With respect to direct connection control of a damper clutch, deceleration-time direct connection control which is performed during a deceleration of an automotive vehicle has also been proposed in addition to the conventional direct connection control which is conducted in a steady operation state.

If direct connection control is performed during a deceleration of an automotive vehicle as described above, the feeding of fuel can be reduced owing to inertia force on a side of driving wheels while preventing a drop in the engine speed. The fuel consumption can therefore be improved.

Deceleration-time direct connection control however involves a problem as will be described next.

If deceleration-time direct connection control is performed by fully closing a throttle valve from the running state that a damper clutch is in a direct connection control state or in a slipped direct connection control state (i.e., the state of direct connection in a slipped direct connection range so that the connection is accompanied by a certain degree of slip), a change in torque of an engine caused by the closure of the throttle valve is transmitted directly to a turbine shaft as an output side of a torque converter so that a shock or a judder occurs on a wheel-driving side.

As a measure for overcoming such a problem, it may be contemplated of once bringing the damper clutch into a non-direct connection state and initiating the deceleration-time direct connection control after allowing the torque converter to absorb the change in torque. Adoption of this measure however leads to another problem which will be described next.

Since the feeding of fuel to the engine is reduced during the deceleration-time direct connection control, the hydraulic pressure for holding the damper clutch in the deceleration-time direct connection state is set at a very low level. Even if it is attempted to change the damper clutch from the non-direct connection state to the direct connection state by this low holding hydraulic pressure, the low holding hydraulic pressure cannot supersede a release pressure still remaining on a release side (i.e., the side on which feeding of a hydraulic pressure changes the damper clutch into the non-direct connection state) so that the damper clutch is not promptly brought into the deceleration-time direct connection state. The engine speed therefore drops and feeding of fuel is therefore resumed on a side of an engine control unit. It is therefore impossible to improve the fuel consumption.

If a high apply pressure (i.e., a pressure applied to a side on which feeding of a hydraulic pressure directly connects the damper clutch) sufficient to supersede the release pressure is caused to act, the damper clutch undergoes rapid engagement so that a shock occurs in a drive system.

When braked hard on a low μ road (low friction coefficient road) such as a snow-covered road or in a like situation, the brake on the side of the driving wheels is transmitted to the engine to brake revolutions of the engine provided that deceleration-time connection control (including slipped connection to non-slip connection) is being performed. It is therefore necessary to release the direct connection state of the damper clutch so that the engine speed can be maintained at a predetermined level. Application of a high apply pressure to the damper clutch, however, may lead to a delay in the release of the direct connection state, thereby involving the potential problem that the engine speed is lowered to cause an engine stall.

This is also attributed to the circumstance that the capacity of an oil pump of the transmission is dependent on the engine speed and a drop in the engine speed at the time of a deceleration reduces the capacity of the oil pump of the transmission, thereby failing to promptly release the direct connection of the damper clutch.

Further, the delivery rate of the oil pump is also lowered when release of the direct connection under the deceleration-time connection control and the shift control take place at the same time. This lowered delivery rate is also responsible.

SUMMARY OF THE INVENTION

With the foregoing in view, the present invention has as a primary object the achievement of control of a vehicle engine, which is arranged in association with a fluid coupling having a clutch, without causing a shock in a drive system, an engine stall or the like.

In one aspect of the present invention, there is thus provided a control method of an engine for a vehicle, said engine being arranged in association with a fluid coupling having a clutch, which comprises the following steps:

detecting the state of engagement of said clutch;

determining whether or not the vehicle is in a predetermined decelerated operation state; and increasing an output of said engine when said clutch has been detected to be in a predetermined state of engagement in the clutch engagement state detection step and said vehicle has been determined to be in said predetermined decelerated operation state in said decelerated operation state determination step.

Subsequent to said output increasing step, said control method may further comprise the following steps:

counting time to determine whether or not a predetermined time has elapsed since detection of said predetermined decelerated operation state; and stopping said increase in said output of said engine when an elapse of said predetermined time has been detected in said time counting step.

The control method according to the present invention can avoid an engine stall even if the clutch is brought into engagement at the time of a deceleration.

DESCRIPTION OF THE PREFERRED EMBODIMENT

With reference to the accompanying drawings, a description will hereinafter be made of the control method according to the embodiment of the present invention for the vehicle engine arranged in association with the fluid coupling having the clutch as well as an engine control system and a clutch control system, both of which relate to the control method.

Figure 2:
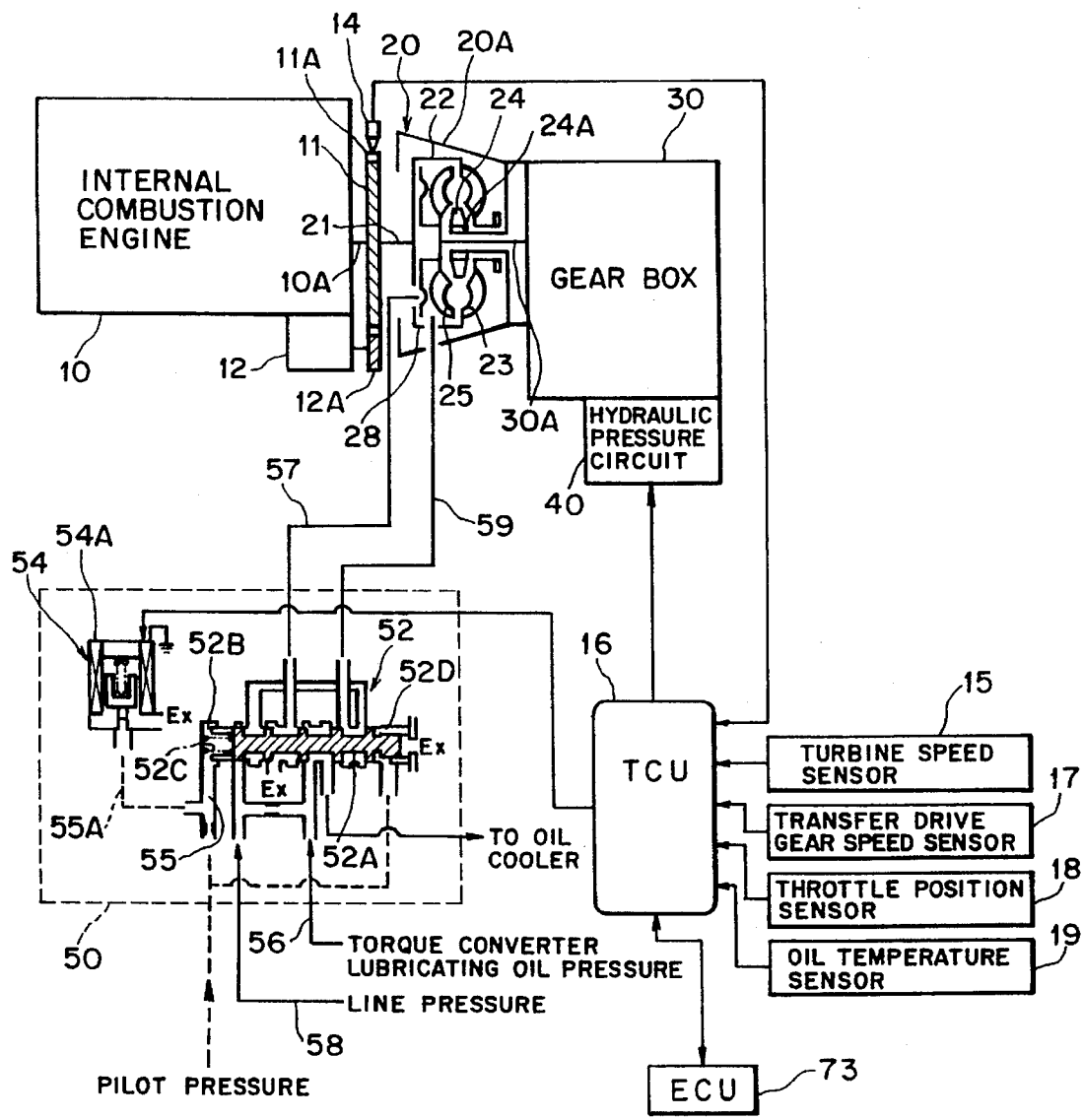
FIG. 2 is an overall block diagram showing an engine system which relates to the control method according to the embodiment of the present invention for the vehicle engine arranged in association with the fluid coupling having the clutch, in which the control method is described by focusing on its clutch control.

When focused on a control system for a torque converter and a damper clutch in an automatic transmission controlled by the control method, an engine system diagram can be illustrated as shown in FIG. 2. As is depicted there, a flywheel 11 is mounted on a crankshaft 10A of an internal combustion engine 10 (which may hereinafter be called simply "the engine 10").

One end of a drive shaft 21 in a torque converter (which is in the form of a fluid coupling equipped with a clutch) 20, which constitutes a drive force transmitting mechanism, is connected to the crankshaft 10A via the flywheel 11.

The torque converter 20 is provided with a casing 20A, a pump 23, a stator 24 and a turbine 25. The pump 23 is connected to an opposite end of the drive shaft 21 via a casing 22 of the torque converter 20, whereas the stator 24 is connected to the casing 20A via a one-way clutch 24A.

Further, the turbine 25 is connected to an input shaft 30A of a gearbox 30.

The torque converter 20 is also provided with a slippable direct connection clutch 28, which will hereinafter be called "the damper clutch". This damper clutch 28 is arranged to permit solid connection of the torque converter 20 between an inlet side and an outlet side thereof.

Described specifically, the damper clutch 28 is interposed between the damper-clutch-inputting casing 22 and the turbine 25, and is constructed in such a way that direct mechanical connection can be established between the pump 23 and the turbine 25 in the torque converter 20 while permitting a predetermined slip therebetween even during engagement (direct connection).

A control system is also provided to control the torque converter 20 and the damper clutch 28. The amount of each slip of the damper clutch 28 and each torque to be transmitted through the damper clutch can be controlled externally by a damper clutch hydraulic pressure control circuit 50.

The damper clutch hydraulic pressure control circuit 50 is provided with a damper clutch control valve 52 and a damper clutch control solenoid valve 54. The damper clutch control solenoid valve 54 is constructed as a normally-closed on-off valve and its solenoid 54A is electrically connected to a transmission control unit (hereinafter abbreviated as "TCU") 16.

The damper clutch control valve 52 is constructed to change over the line for working oil to be fed to the damper clutch 28 and also to control the hydraulic pressure to be applied to the damper clutch 28.

Namely, the damper clutch control valve 52 is constructed of a spool 52A, a left-end compartment 52B capable of receiving therein a left-hand end portion of the spool 52A as viewed in FIG. 2, and a spring 52C pressing the spool 52A rightwards as viewed in FIG. 2.

A pilot line 55 which is in communication with an unillustrated pilot hydraulic pressure source is connected to the left-end compartment 52B of the damper clutch control valve 52.

A by-pass line 55A which is communicated to a drain side is connected to the pilot line 55 and a damper clutch control solenoid valve 54 is inserted in the by-pass line 55A, so that a pilot hydraulic pressure to be supplied to the left-end compartment 52B can be controlled in magnitude by either opening or closing the damper clutch control solenoid valve 54.

Further, a right-end compartment 52D into which a right-hand end portion of the spool 52A can advance can also be fed with a hydraulic pressure from the pilot hydraulic pressure source.

When a pilot hydraulic pressure is applied to the left-end compartment 52B and the spool 52A of the damper clutch control valve 52 is caused to move to right-hand dead-end position as viewed in FIG. 2, a lubricating hydraulic pressure supplied to the torque converter 20 is fed through a line 56, the damper clutch control valve 52 and then a line 57 into a hydraulic pressure compartment formed between the input casing 22 and the damper clutch 28, whereby the damper clutch 28 is released from engagement.

Namely, a release pressure for releasing engagement of the damper clutch 28 is applied through the line 57.

When the left-end compartment 52B is not supplied with the pilot hydraulic pressure and the spool 52A moves to a left-hand dead-end position as viewed FIG. 2, a line pressure from an unillustrated hydraulic pump is fed to a hydraulic pressure compartment formed between the damper clutch 28 and the turbine 25 by way of a line 58, the damper clutch control valve 52 and a line 59 so that the damper clutch 28 is brought into frictional engagement with the casing 22.

Namely, an apply pressure which acts to directly connect the damper clutch 28 is caused to act through the line 59.

When the duty ratio DC of the damper clutch control solenoid valve 54 is controlled by TCU 16, the spool 52A moves to a position where the resulting force of the pilot hydraulic pressure acting on the left-end compartment 52B and the spring force of the spring 52C is balanced with the pilot hydraulic pressure acting on the right-end compartment 52D. A hydraulic pressure corresponding to this moved position of the spool 52A is hence fed to the damper clutch 28 so that a torque TC to be transmitted via the damper clutch 28 is controlled at a desired value.

Incidentally, a ring gear 11A which rotates in mesh with a pinion 12A of a starter 12 is externally fitted on an outer periphery of the flywheel 11. This ring gear 11A is provided with a predetermined number of teeth. In opposition to the ring gear 11A, an electromagnetic pickup 14 is additionally disposed as an engine speed sensor.

The electromagnetic pickup (hereinafter called the "NE sensor") 14 serves to detect an engine speed NE of the internal combustion engine 10 and is electrically connected to an input side of TCU 16.

Also connected to the input side of TCU 16 are a turbine speed sensor (NT sensor) 15 for detecting a speed NT of the turbine 25 in the torque converter 20, a transfer drive gear speed sensor (N0 sensor) 17 for detecting a speed N0 of a transfer drive gear (not shown), a throttle position sensor (θT sensor) 18 for detecting a valve position θT of a throttle valve disposed in an unillustrated air intake passage of the internal combustion engine 10, an oil temperature sensor 19 for detecting an oil temperature TOIL of working oil to be delivered from a hydraulic pump (not shown), etc. Therefore, detection signals from the individual sensors are fed to TCU 16.

Although not shown in the drawing, TCU 16 is internally equipped with memories such as ROM or RAM, a central processing unit, an I/O interface, a counter and the like. As will be described next, TCU 16 is designed to perform shifting hydraulic pressure control in accordance with a program stored in the memory.

Figure 15:
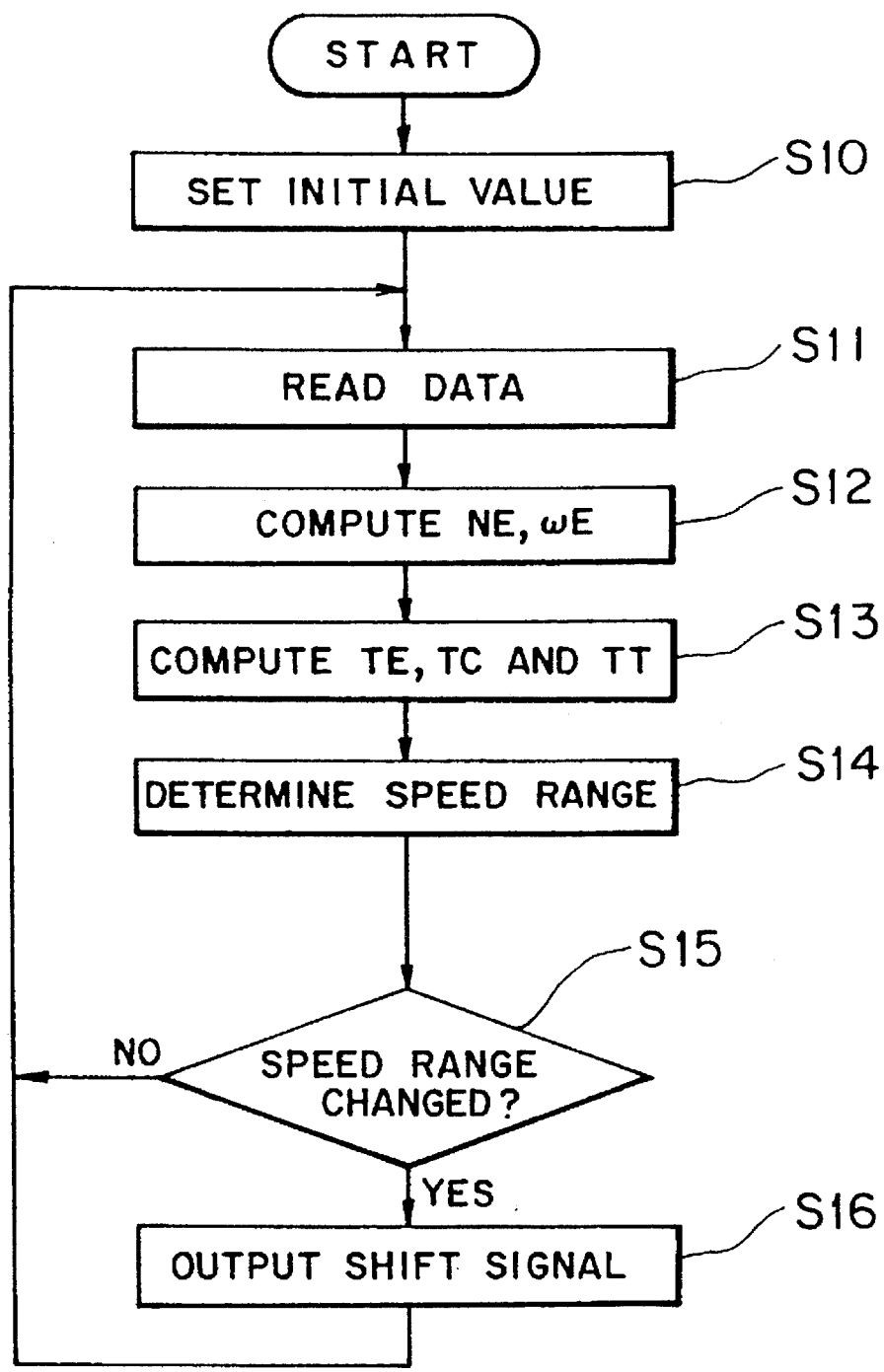
FIG. 15 is a flow chart illustrating the outline of control of an automatic transmission by the control method according to the embodiment of the present invention for the vehicle engine arranged in association with the fluid coupling having the clutch.

TCU 16 repeatedly performs at a predetermined interval, for example, at an interval of 35 HZ the main program routine which is shown in FIG. 15.

In this main program routine, reading or setting of various initial values to be described subsequently herein is first performed in step S10. TCU 16 next reads and stores detection signals from various sensors, namely, the NE sensor 14, the NT sensor 15, the N0 sensor 17, the θT sensor 18, the oil temperature sensor 19, and the like (step S11).

TCU 16 then computes an engine speed NE and a change rate $\omega E$ of the engine speed NE from detection signals from the NE sensor 14 (step S12).

While the ring gear 11A undergoes a full rotation, the NE sensor 14, whenever four teeth of the ring gear 11A are detected, generates one pulse signal and feeds it to TCU 16 so that the engine speed NE and the change rate $\omega E$ of the engine speed NE can be computed.

TCU 16 next computes in step S13 an output torque TE of the engine and a torque TT of the output shaft of the torque converter.

Here, the relationship among a frictional torque TB of the clutch on a released or engaged side, a turbine shaft torque TT and a turbine speed change rate $\omega T$ during shifting can be expressed by the following formula (1):

$$TB = A \cdot TT + B \cdot \omega T \tag{1}$$

where A and B are constants which can be determined by a shift pattern (the kind of a shift), such as an upshift from the 1st speed to the 2nd speed or a downshift from the 4th speed to the 3rd speed, inertia moments of individual rotating parts, etc.

Using an engine output torque TE computed in accordance with the following formula (3), the turbine shaft torque TT is then computed in accordance with the following formula (4). These computed values are stored in the memory described above $$TE = C \cdot NE^2 + TC \tag{2}$$

$$\begin{aligned} TT &= T(TE - TC) + TC \\ &= T \cdot C \cdot NE^2 + TC \end{aligned} \tag{3}$$

where TE is a torque obtained by subtracting a friction loss, an oil pump drive torque and the like from an average torque produced by expansion in the internal combustion engine 10, and C is a torque capacity coefficient and is read from a torque converter characteristic table, which has been stored in advance in the memory, in accordance with a speed ratio E (=NT/NE) of the turbine speed NT to the engine speed NE.

Accordingly, after computing the speed ratio E from the turbine speed NT detected by the NT sensor 15 and the engine speed NE detected by the NE sensor 14 as described above, the torque capacity coefficient C corresponding to the speed ratio E so computed is read from the memory.

T represents a torque ratio. This is also read from the torque converter characteristic table, which has been stored in advance in the memory, in accordance with the speed ratio E of the turbine speed NT to the engine speed NE.

TC is a torque transmitted through the damper clutch 28. In a slippable direct-connection clutch of this type, the torque TC can be given by the following formula (4):

$$\begin{aligned} TC &= PC \cdot AR \cdot R \cdot \mu \\ &= A1 \cdot DC - B1 \end{aligned} \tag{4}$$

where,

PC: hydraulic pressure fed to the damper clutch 28,

AR: pressure-receiving area of the piston of the damper clutch 28,

R: frictional radius of the damper clutch 28, and

μ: friction coefficient of the damper clutch 28.

Since the hydraulic pressure PC fed to the damper clutch 28 is proportional to the duty ratio DC of the damper clutch control solenoid valve 54, the above formula (4) has been derived.

Incidentally, A1 and B1 are constants which are set depending on the shift mode. Further, the value of TC which is computed according to the formula (4) is effective where it is positive, but is set at 0 (TC=0) where it is negative.

In the above-described manner, instantaneous values of the engine torque TE and turbine shaft torque TT are computed and determined depending on an engine speed NE detected by the NE sensor 14, a turbine speed NT detected by the NT sensor 15 and a duty ratio DC of the damper clutch control solenoid valve 54.

From a valve position $\theta T$ of the throttle valve and a transfer drive gear speed N0, TCU 16 then determines in step S14 a speed range to be established at the gear-box 30.

Next, TCU 16 determines whether or not the speed range determined to be established in step S14 is different from the result determined in the preceding duty cycle (step S15). When not different, the routine returns to step S11 and step S11 onwards are executed repeatedly. When different, a shift signal corresponding to a shift pattern of the result determined in step S14 is outputted to a hydraulic circuit 40 (step S16) and the routine then returns to step S11.

Upon receipt of the signal outputted in step S16, power on/off hydraulic control is performed by TCU 16 and the hydraulic circuit 40 so that the shifting is controlled.

Figure 1:
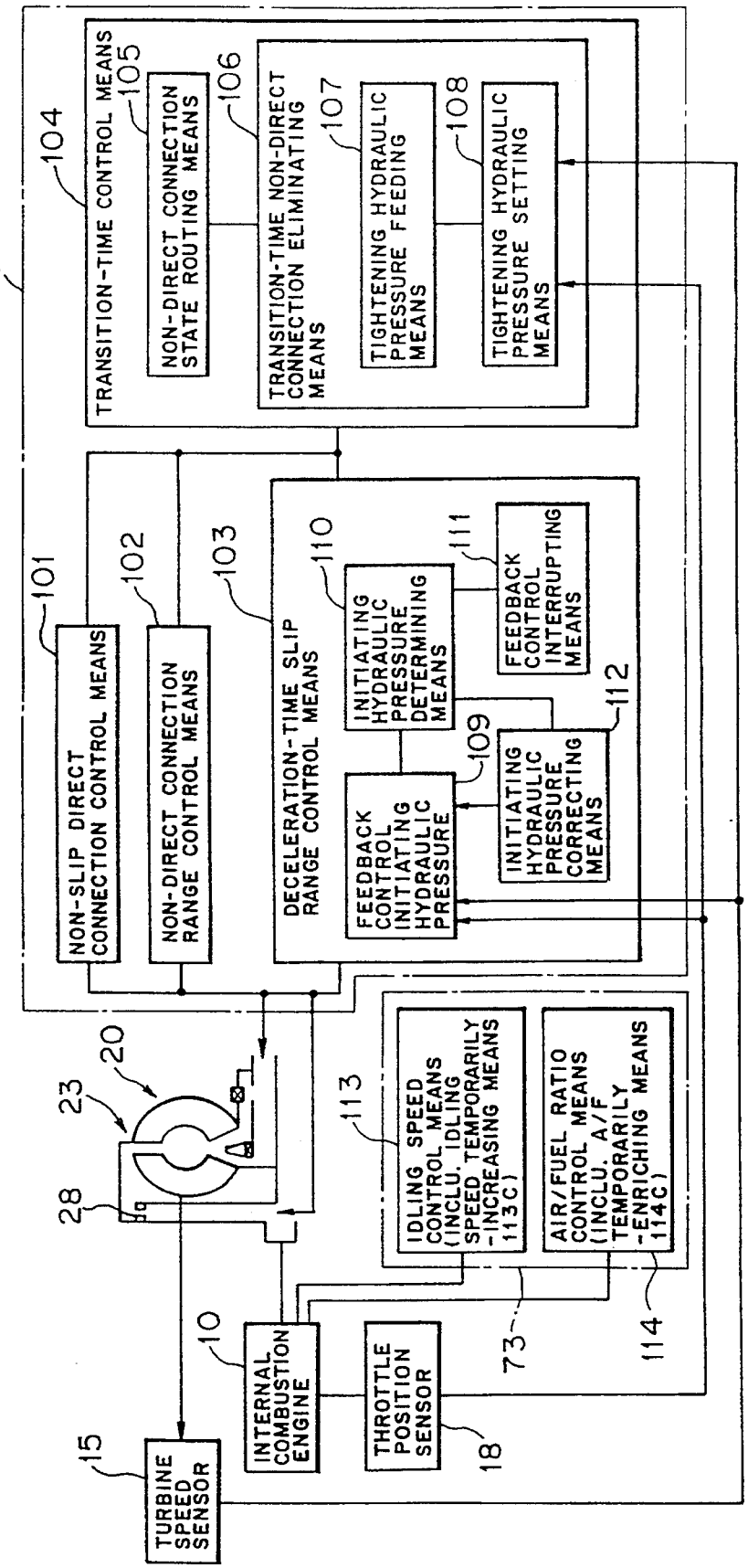
FIG. 1 is a control block diagram showing a control method according to one embodiment of the present invention for a vehicle engine arranged in association with a fluid coupling having a clutch, in which the control method is described by focusing on its control function.

Incidentally, the functional construction of the control system for the damper clutch 28 and the engine 10 is designed as shown in FIG. 1. By control signals outputted as a result of the prescribed computations at TCU 16, the damper clutch hydraulic pressure control circuit 50 is actuated to perform control as needed.

Described specifically, non-slip direct connection control means 101 is arranged to control the damper clutch 28 in a solid connection state. It is to be noted that the term "non-slip direct connection control" may be expressed merely as "direct connection control". In the present application, however, other controls may be accompanied by a slip of the damper clutch 28 in some instances whereas this direct connection control is absolutely free of any slip at the damper clutch 28. To clarify this difference, the term "direct connection control" is modified by the word "non-slip" in the present application. When operated in the non-slip direct connection range shown in FIG. 9, the non-slip direct connection control means 101 feeds a predetermined apply pressure to the damper clutch 28 through the line 59 in response to a control signal from TCU 16, so that the damper clutch 28 is brought into a predetermined solid connection state and the operation is hence performed relying primarily on a drive force transmitted via the damper clutch 28.

Figure 9:
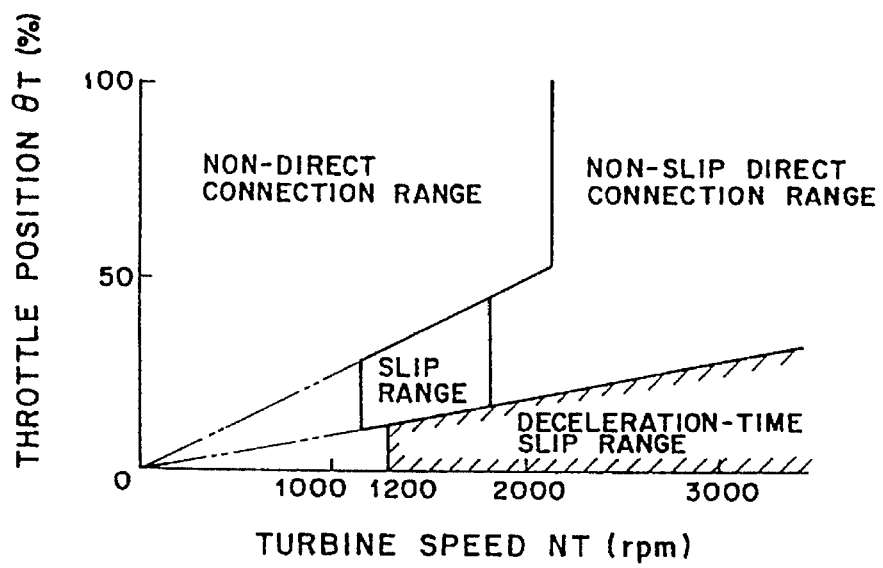
FIG. 9 is a diagram showing effects of the clutch control of the control method according to the embodiment of the present invention for the vehicle engine arranged in association with the fluid coupling having the clutch.

The characteristic diagram of FIG. 9 classifies operation states in accordance with the speed of the turbine 25 plotted along the axis of abscissas and the throttle position plotted along the axis of ordinates. When from a turbine speed NT detected by the NT sensor 15 and a throttle position $\theta T$ detected by the $\theta T$ sensor 18, an operation state is found to fall in the non-slip direct connection range in the diagram, control is performed by the non-slip direct connection control means 101.

Further, non-direct connection range control means 102 is also provided to control the damper clutch 28 in a non-direct connection state.

When operated in the non-direct connection range shown in FIG. 9, the non-direct connection range control means 102 feeds a predetermined release pressure to the damper clutch 28 through the line 57 in response to a control signal from TCU 16, so that the damper clutch 28 is brought into a predetermined non-direct connection state and the operation is performed relying primarily upon a drive force transmitted via the torque converter 20.

In the slip range shown in FIG. 9, the non-slip direct connection control means 101 and the non-direct connection range control means 102 cooperate with each other to regulate an apply pressure and a release pressure, whereby operation control is performed with a predetermined degree of slipping.

Deceleration-time slip range control means 103 is also arranged to perform feedback control of the damper clutch 28 in a predetermined deceleration-time slip state during decelerated operation of the automotive vehicle.

When operated in the deceleration-time slip range shown in FIG. 9 (equivalent to decelerated operation of a vehicle), the deceleration-time slip range control means 103 feeds a predetermined apply pressure through the line 59 and a predetermined release pressure through the line 57 in response to a control signal from TCU 16, so that the damper clutch 28 is brought into a predetermined connection state and the operation is hence performed relying primarily upon a drive force transmitted via the damper clutch 28.

The deceleration-time slip range in which the deceleration-time slip range control means 103 is actuated is set to an operation state defined by speeds NT of the turbine 25 greater than a predetermined value (for example, 1,200 rpm and higher) and throttle positions θT smaller than a predetermined value. Detection of whether operation is in the deceleration-time slip range (i.e., the vehicle is in a decelerated operation state) is achieved by determining it on the basis of a speed NT of the turbine 25 and a throttle position θT as described above.

Transition-time control means 104 is also arranged, which is actuated upon transition to a deceleration-time slip control state from an operation state other than the deceleration-time slip control state to avoid a shock which would otherwise occur at the time of the transition.

The transition-time control means 104 is provided with non-direct connection state routing means 105 so that the damper clutch 28 is operated through a non-direct connection state to absorb a change in torque upon deceleration of the engine 10.

Figure 10:
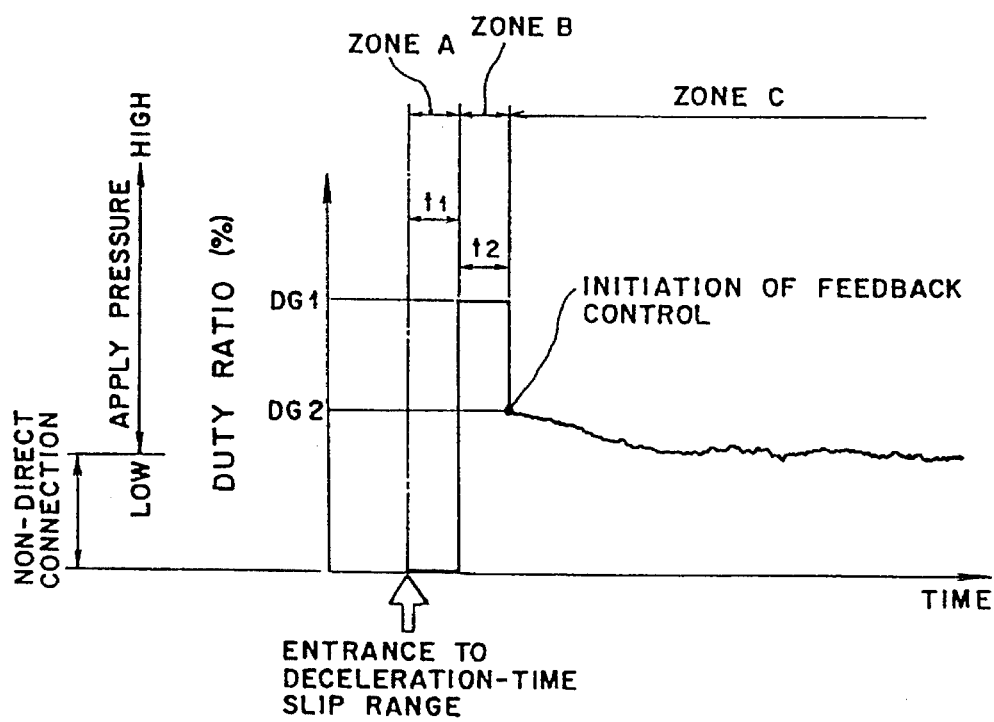
FIG. 10 is another diagram showing effects of the clutch control of the control method according to the embodiment of the present invention for the vehicle engine arranged in association with the fluid coupling having the clutch.

As depicted in FIG. 10, zone A in which the duty ratio is maintained at 0% is provided for a predetermined time $t_1$ from the time of entrance to the deceleration-time slip range. In zone A, the non-direct connection state routing means 105 once brings the damper clutch 28 into a non-direct connection state so that a change in the engine torque due to a change in the throttle position is absorbed through a slip of the damper clutch 28.

Here, zone A is set, for example, at a time required for a single computing cycle by the control system or so.

The transition-time control means 104 is provided with transition-time non-direct connection eliminating means 106 which serves to eliminate in an early stage a non-direct connection state established by the non-direct connection state routing means 105.

Further, the transition-time non-direct connection eliminating means 106 is provided with tightening hydraulic pressure feeding means 107 for feeding a hydraulic pressure to directly connect the damper clutch 28 and also with tightening hydraulic pressure setting means 108 for setting a hydraulic pressure to be fed by the tightening hydraulic pressure feeding means 107.

The term "tightening hydraulic pressure" as used will next be defined. To bring a clutch into a non-direct connection state, a hydraulic pressure is applied to a release side of the clutch. Even if the application of this hydraulic pressure to the release side subsequent to the establishment of the non-direct connection state, a residual pressure still remain on the release side. Upon connection (either non-slip direct connection or slip connection) of the clutch subsequent to the non-direct connection, it is desired to feed an apply hydraulic pressure of appropriate level to an apply side of the clutch after elimination of the residual pressure on the release side. The term "tightening hydraulic pressure" means a hydraulic pressure which as described above, is fed to the apply side at the same level as the residual pressure so that the residual pressure on the release side is canceled by the tightening hydraulic pressure fed to the apply side.

Incidentally, an unduly high "tightening hydraulic pressure" produces a shock upon engagement of the clutch while an unduly low "tightening hydraulic pressure" cannot cancel the residual pressure on the release side and cannot promptly bring the clutch into engagement. Accordingly, it is necessary to control the "tightening hydraulic pressure" to an appropriate level corresponding to the residual pressure on the release side.

As is illustrated in FIG. 10, subsequent to zone A in which the damper clutch 28 has been brought to the non-direct connection state, zone B is provided for a predetermined time $t_2$ in which a hydraulic pressure is fed at a duty ratio DG1 to the apply side. In zone B, the tightening hydraulic pressure feeding means 107 eliminates any residual pressure on the release side.

Further, the tightening hydraulic pressure setting means 108 is constructed in such a way that the setting of the duty ratio DG1 corresponding to the tightening pressure to be fed to the apply side is effected relying upon a turbine speed NT of the torque converter 20 and a throttle position θT of the engine 10 at the time immediately before entrance to the deceleration-time slip range (in other words, immediately before entrance to zone A).

Figure 11:
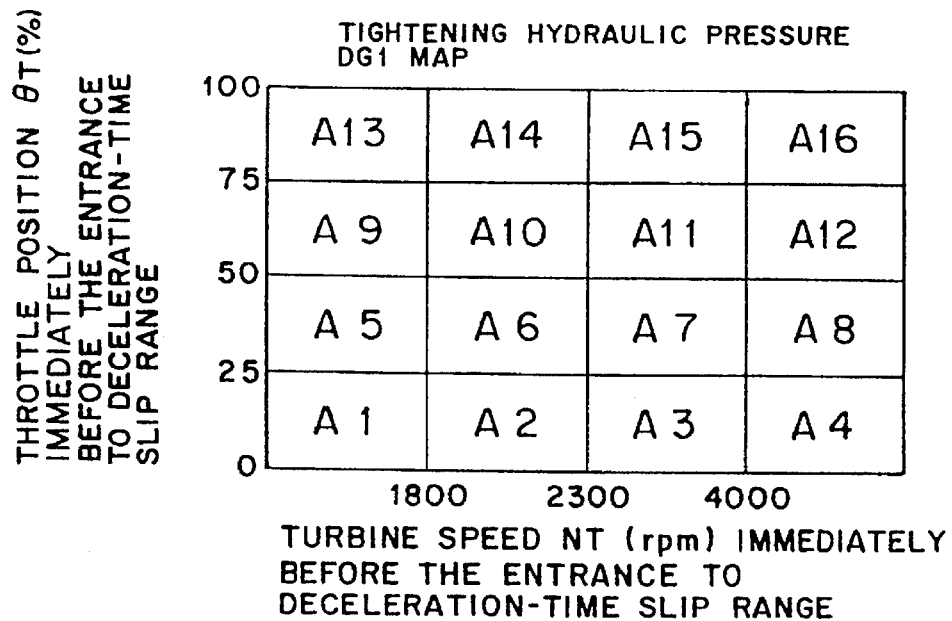
FIG. 11 is a further diagram showing effects of the clutch control of the control method according to the embodiment of the present invention for the vehicle engine arranged in association with the fluid coupling having the clutch.

FIG. 11 is a map in which preset values of tightening hydraulic pressure are divided. The entire operation range is divided into sections A1 to A16. For each of the sections, a preset value is stored. Each preset value is dependent on the turbine speed NT plotted along the axis of abscissas and the throttle position θT plotted along the axis of ordinates and has been determined to permit elimination of effects of any residual pressure left as a result of an apply pressure fed in the non-slip direct connection range or the slip connection range immediately before entrance to the deceleration-time slip range. In the illustrated embodiment, the duty ratio DG1 is set smaller as the turbine speed immediately before entrance to the deceleration-time slip range increases but is set greater as the throttle position immediately before entrance to the deceleration-time slip range increases. This tendency is observed consistently insofar as the damper clutch 28 is in a direct connection state upon entrance to the deceleration-time slip range. Incidentally, another amount indicating an engine load such as the amount of intake air per unit revolutions of the engine (A/N) may be used in place of the throttle position θT. Similarly, the vehicle speed may be used instead of the turbine speed NT.

A feedback control initiating hydraulic pressure 109, which is fed to directly connect the damper clutch 28 (to the apply side) so that feedback control can be initiated by the deceleration-time slip range control means 103, is determined depending on the turbine speed of the torque converter 20 and the throttle position of the engine 10 at the time of entrance to the deceleration-time slip range.

Figure 12:
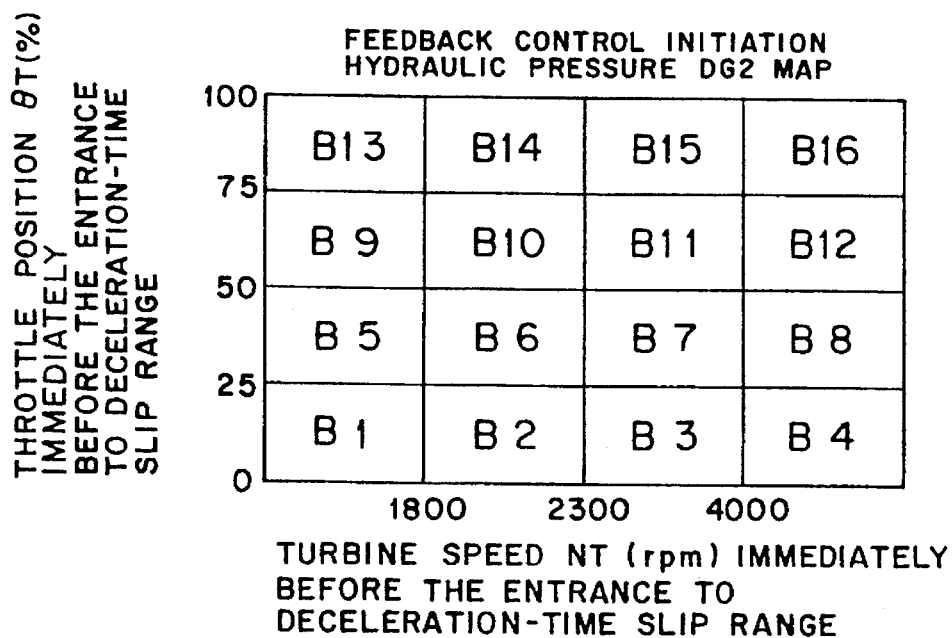
FIG. 12 is a still further diagram showing effects of the clutch control of the control method according to the embodiment of the present invention for the vehicle engine arranged in association with the fluid coupling having the clutch.

FIG. 12 shows a map in which preset values of the feedback control initiating hydraulic pressure 109 are divided. The entire operation range is divided into sections B1 to B16. For each of the sections, a preset value is stored. Each preset value is dependent on the turbine speed NT plotted along the axis of abscissas and the throttle position θT plotted along the axis of ordinates and has been determined to permit determination of a duty ratio DG2, which is suited to achieve in a short time a target feedback value to converge, corresponding to an apply pressure fed in the non-slip direct connection range or the slip connection range immediately before entrance to the deceleration-time slip range. In the illustrated embodiment, the dependence of the duty ratio DG2 on the turbine speed NT is not so high as in the case of the duty ratio DG1 but is set at a slightly larger value as the turbine speed immediately before entrance to the deceleration-time slip range increases.

As an alternative, a preset constant value may be used as this duty ratio DG2 without using such a map. Like DG1, the duty ratio DG2 can also be determined using the amount of intake air (A/N) and the vehicle speed in place of the throttle position θT and the turbine speed NT, respectively.

Also arranged are initiating hydraulic pressure determining means 110 for determining upon feedback control by the deceleration-time slip range control means 103 if the feedback control initiating hydraulic pressure 109 is too high or too low, initiating hydraulic pressure correcting means 112 for correcting the next feedback control initiating hydraulic pressure 109 on the basis of the results of the determination by the initiating hydraulic pressure determining means 110, and feedback control interrupting means 111 for interrupting feedback control when occurrence of a shock is expected from the results of the determination by the initiating hydraulic pressure determining means 110.

Figure 13:
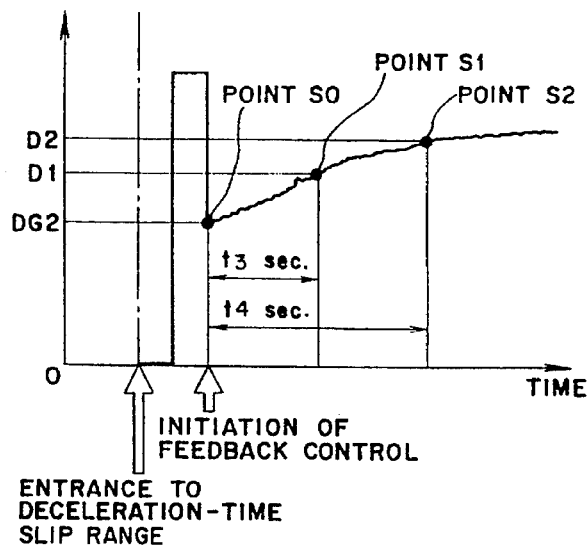
FIG. 13 is a still further diagram showing effects of the clutch control of the control method according to the embodiment of the present invention for the vehicle engine arranged in association with the fluid coupling having the clutch.

The initiating hydraulic pressure determining means 110 is constructed to determine, by using a change in the duty ratio shown diagrammatically in FIG. 13, whether a feedback control initiating hydraulic pressure is adequate.

In FIG. 13, the duty ratio to which the hydraulic pressure to be fed to the damper clutch 28 is adjusted is plotted along the axis of ordinates, while time is plotted along the axis of abscissas. FIG. 13 therefore illustrates variations of the duty ratio in the deceleration-time slip control state.

As is shown in the diagram, the feedback control in a deceleration-time slip state is performed from a point S0. The duty ratio gradually changes so that it approaches a target control. As a consequence, the duty ratio reaches the duty ratio D1 $t_3$ second after the initiation of the control and the duty ratio D2 $t_4$ second after the initiation of the control.

The initiating hydraulic pressure determining means 110 is constructed to determine by the change $\Delta D$ from duty ratio $D_1$ to the duty ratio $D_2$ (=D2–D1) if the feedback control initiating hydraulic pressure is too high or too low.

The initiating hydraulic pressure correcting means 112 which corrects the next feedback control initiating hydraulic pressure 109 by the change $\Delta D$ detected by the initiating hydraulic pressure determining means 110 is constructed as will be described next.

Figure 14:
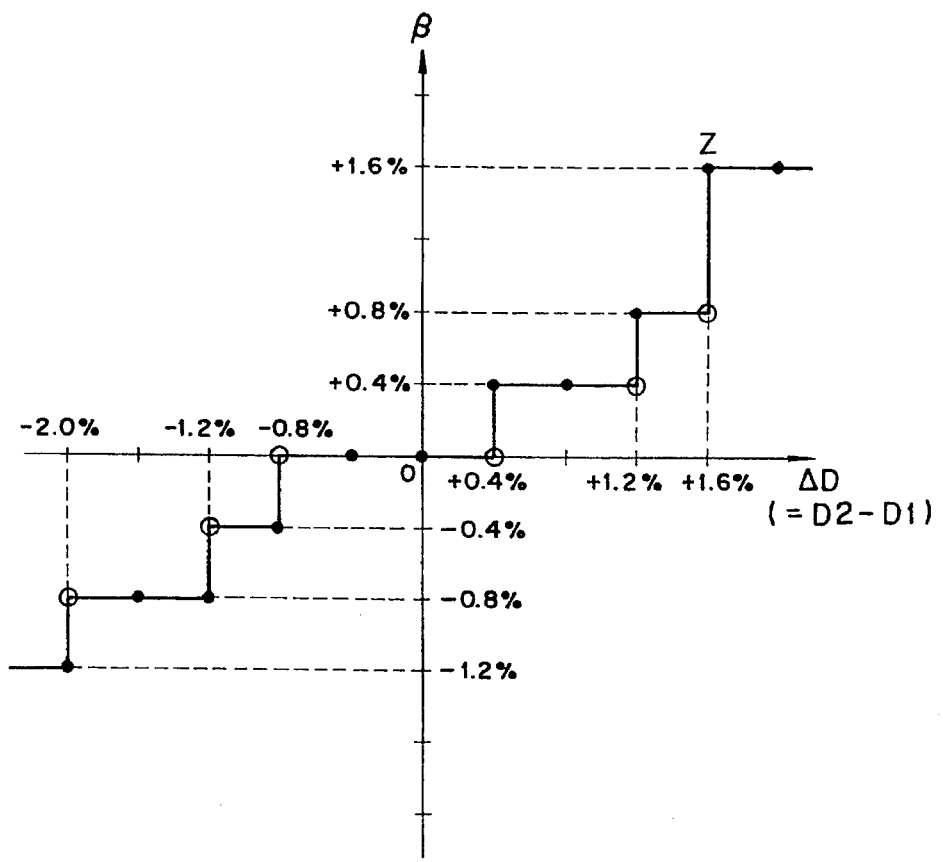
FIG. 14 is a still further diagram showing effects of the clutch control of the control method according to the embodiment of the present invention for the vehicle engine arranged in association with the fluid coupling having the clutch.

FIG. 14 diagrammatically illustrates correction characteristics. Changes $\Delta D$ in the duty ratio are plotted along the axis of abscissas, while correction amounts $\beta$ for the changes $\Delta D$ in the duty ratio are plotted along the axis of ordinates.

The correction characteristics of FIG. 14 are stored in TCU 16. In accordance with the correction characteristics, the initiating hydraulic pressure correcting means 112 determines a correction amount $\beta$ for a change $\Delta D$ in the duty ratio calculated by the initiating hydraulic pressure determining means 110 and then adds the correction amount $\beta$ to a current duty ratio to determine a duty ratio DG2 for use upon initiation of the next feedback control.

As a consequence, the duty ratio DG2(n) for use upon initiation of the $n^{th}$ feedback control in deceleration-time slip control can be expressed by the following formula:

$$DG2(n) = DG2 + \Sigma \beta_i \quad (5)$$

where $\Sigma \beta_i$ is the sum of correction amounts from the $1^{st}$ feedback control to the $(n-1)^{th}$ feedback control.

Incidentally, the correction characteristics shown in FIG. 14 have been set based on the following consideration.

Assume that the hydraulic pressure on the apply pressure side in the above feedback control has become higher, for example, by 5% or more in duty ratio than a hydraulic pressure to converge in the feedback control. If sudden brakes are applied on a low-μ road at this time point, release of a direct connection state of the damper clutch 28 is delayed and the engine speed NE is lowered, resulting in the potential problem that the engine may stall.

The above potential problem can be attributed to the performance of the above feedback control at a hydraulic pressure as low as 0.5 kg/cm$^2$ or so in the deceleration-time slip range.

To achieve prompt release of the direct connection of the damper clutch 28, a release pressure of a predetermined value is needed. The release of the direct connection state is however conducted under such situations that the working pressure in the entire control system is low and the release pressure for the damper clutch 28 is also low. It therefore takes a lot of time to release the direct connection even if an excess in the pressure of the working oil is as small as an overshoot in the feedback control.

This can also be attributed to the circumstance that the release pressure fed from the pump driven by the internal combustion engine 10 as a drive source cannot be increased promptly because the supply of fuel to the internal combustion engine 10 has also been cut (i.e., reduced) by the deceleration-time slip range control.

Accordingly, when brakes have been applied to reduce rotations on a side of wheels but release of direct connection has not been fully achieved, the braking force is transmitted to a side of the internal combustion engine 10 and may hence result in stalling of the internal combustion engine 10.

To cope with this potential problem, a measure has been taken to make the working hydraulic pressure in the feedback control somewhat lower relative to the hydraulic pressure to converge in the feedback control.

First, the feedback control initiating hydraulic pressure DG2 is set at a relatively low level to avoid any unduly high working hydraulic pressure at the time of initiation.

Further, the correction amount $\beta$ for convergence after the initiation of the feedback control is set at a value smaller than a correction value determined according to linear characteristics (the characteristics extending from point 0 to point Z in FIG. 14).

Where the change $\Delta D$ in duty ratio is 0.4% or greater but is smaller than 1.2%, for example, the correction amount $\beta$ is set at 0.4% so that compared with a duty ratio change $\Delta D$ close to 1.2%, the correction amount so set is smaller by about 0.8%.

The working hydraulic pressure may drop beyond a predetermined lower limit or despite the above-mentioned consideration, may become too high in the feedback control. To avoid occurrence of a shock on a drive system in such a situation, the feedback control interrupting means 111 is also provided to interrupt the feedback control.

If the working hydraulic pressure in the feedback control drops by 5% or more in duty ratio than the hydraulic pressure to converge, the control is initiated from the non-direct connection range. As a result, lowering of the engine speed NE proceeds so that the fuel cut (i.e., reduction) of the engine may be terminated.

Further, the feedback hydraulic pressure becomes higher by an increase in the slip amount, leading to the potential problem that a shock may occur upon entrance to the deceleration-time slip range.

Such a shock takes place at least 10 seconds after initiation of the feedback control. When the change $\Delta D$ in duty ratio at the point S2 is equal to or greater than a predetermined pressure and further continuation of the control in the same manner is found to produce such a shock, the feedback control interrupting means 111 interrupts the feedback control in a sufficiently short time so that the control is changed to the control by the non-direct connection range control means 102.

Figure 16:
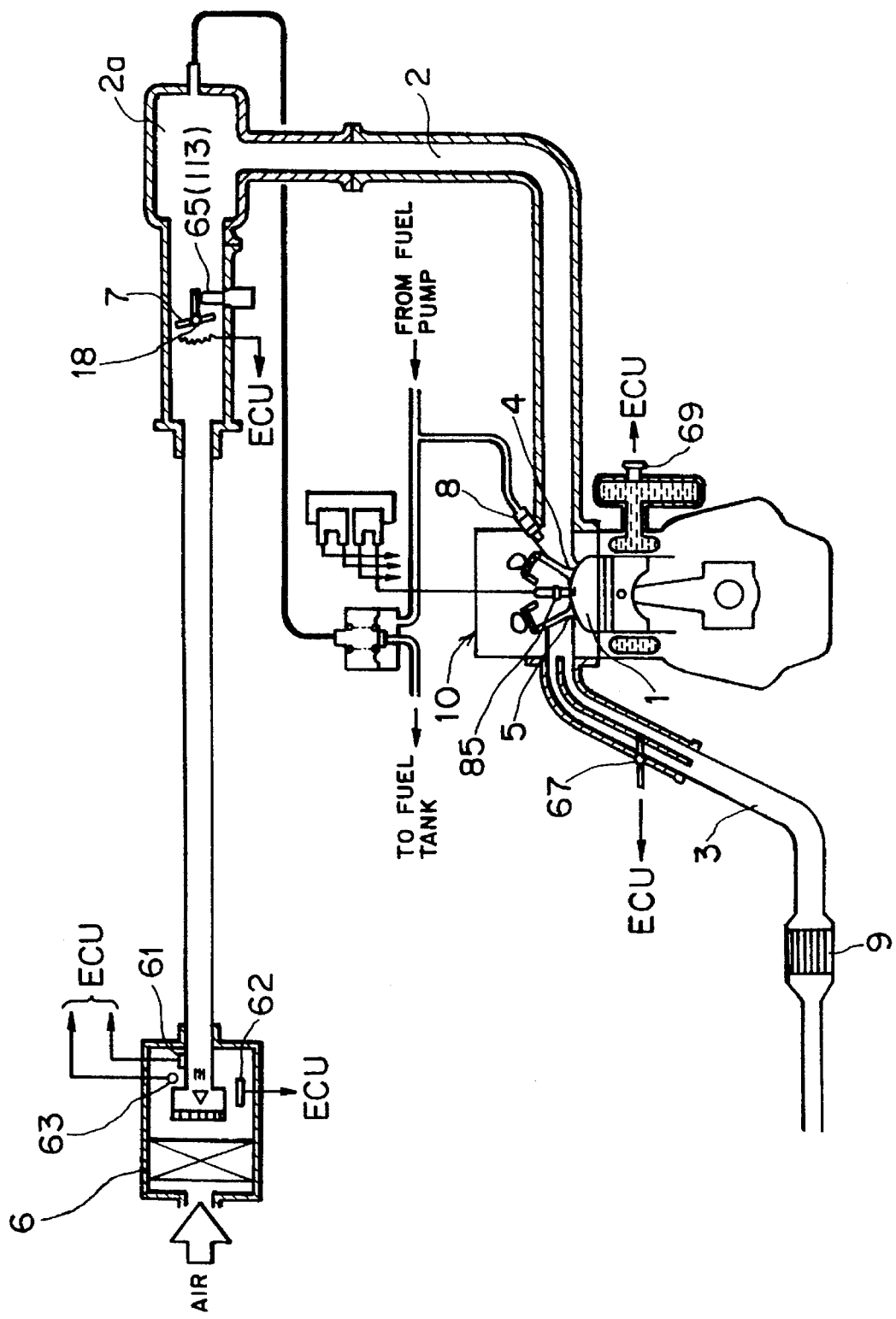
FIG. 16 is a schematic illustration of an engine system suited for use in the practice of the control method according to the embodiment of the present invention for the vehicle engine arranged in association with the fluid coupling having the clutch.

An engine control system will next be described. FIG. 16 is an engine system diagram illustrated by focusing on the engine control system suited for use in the practice of the control method. As is shown there, the engine 10 has an intake passage 2 and an exhaust passage 3, both of which are communicated to a combustion chamber 1. The communication between the intake passage 2 and the combustion chamber 1 is controlled by an intake valve 4, while the communication between the exhaust passage 3 and the combustion chamber 1 is controlled by an exhaust valve 5.

The intake passage 2 is provided with an air cleaner 6, a throttle valve 7 and a solenoid-type fuel injection valve (injector) 8 as fuel feeding means, which are arranged successively from an upstream side of the intake passage 2. The exhaust passage 3, on the other hand, is provided with an catalytic converter (three-way catalyst) 9 for the purification of exhaust gas and an unillustrated muffler (noise eliminator) successively from an upstream side of the exhaust passage 3. The intake passage 2 is also provided with a surge tank 2a.

An intake manifold is provided with injectors 8 as many as the number of cylinders.

If the engine 10 in the illustrated embodiment is an in-series 4-cylinder engine, four injectors 8 are arranged. The engine 10 can therefore be called a multi-cylinder engine of the multipoint fuel injection (MPI) type.

The throttle valve 7 is connected to an accelerator pedal by way of a wire cable, whereby its position (opening) varies depending on the amount of depression of the accelerator pedal. In addition, the throttle valve 7 can also be driven, i.e., opened or closed by an idling speed control motor (ISC motor) 86 which constitutes idling speed control means 113. This has made it possible to change the position of the throttle valve 7 to perform idling speed control (ISC control) in the course of idling without the need for depression of the accelerator pedal. Incidentally, similar ISC control can also be performed by arranging a bypass passage in such a way that the position of arrangement of the throttle valve 7 is circumvented and also by providing the bypass passage with an open/close valve (ISC valve) to control the amount of air to be inducted through the bypass passage.

In the above engine, air which has been inducted through the air cleaner 6 in accordance with the position of the throttle valve 7 is mixed with fuel from the injector 8 in the intake manifold to achieve an appropriate air/fuel ratio. The resulting air-fuel mixture is then ignited at a suitable timing by a spark plug 85 in the combustion chamber 1, whereby the air-fuel mixture is caused to burn to produce an engine torque. The resulting gaseous mixture is then discharged as exhaust gas into the exhaust passage 3 and subsequent to purification (elimination) of three noxious components, i.e., CO, HC and $NO_x$ in (from) the exhaust gas by the catalytic converter 9, the exhaust gas is deaden in noise by the muffler and then released into the atmosphere.

To control the engine 10, various sensors are arranged. On a side of the intake passage 2, there are disposed, at the position of arrangement of the air cleaner 6, an air flow sensor (inducted air amount sensor) 61 for detecting the amount of inducted air from Karman vortex information, an intake air temperature sensor 62 for detecting the temperature of the intake air, and an atmospheric pressure sensor 63 for detecting the atmospheric pressure. Also disposed at the position of arrangement of the throttle valve 7 are a throttle sensor 18 in the form of a potentiometer for detecting the position of the throttle valve 7, an idling switch 65 for detecting an idling state, etc.

On the side of the exhaust passage 3, an oxygen concentration sensor 67 (hereinafter called simply "the $O_2$ sensor 67") for detecting the concentration of oxygen ($O_2$ concentration) in the exhaust gas is disposed on an upstream side of the catalytic converter 9.

Figure 17:
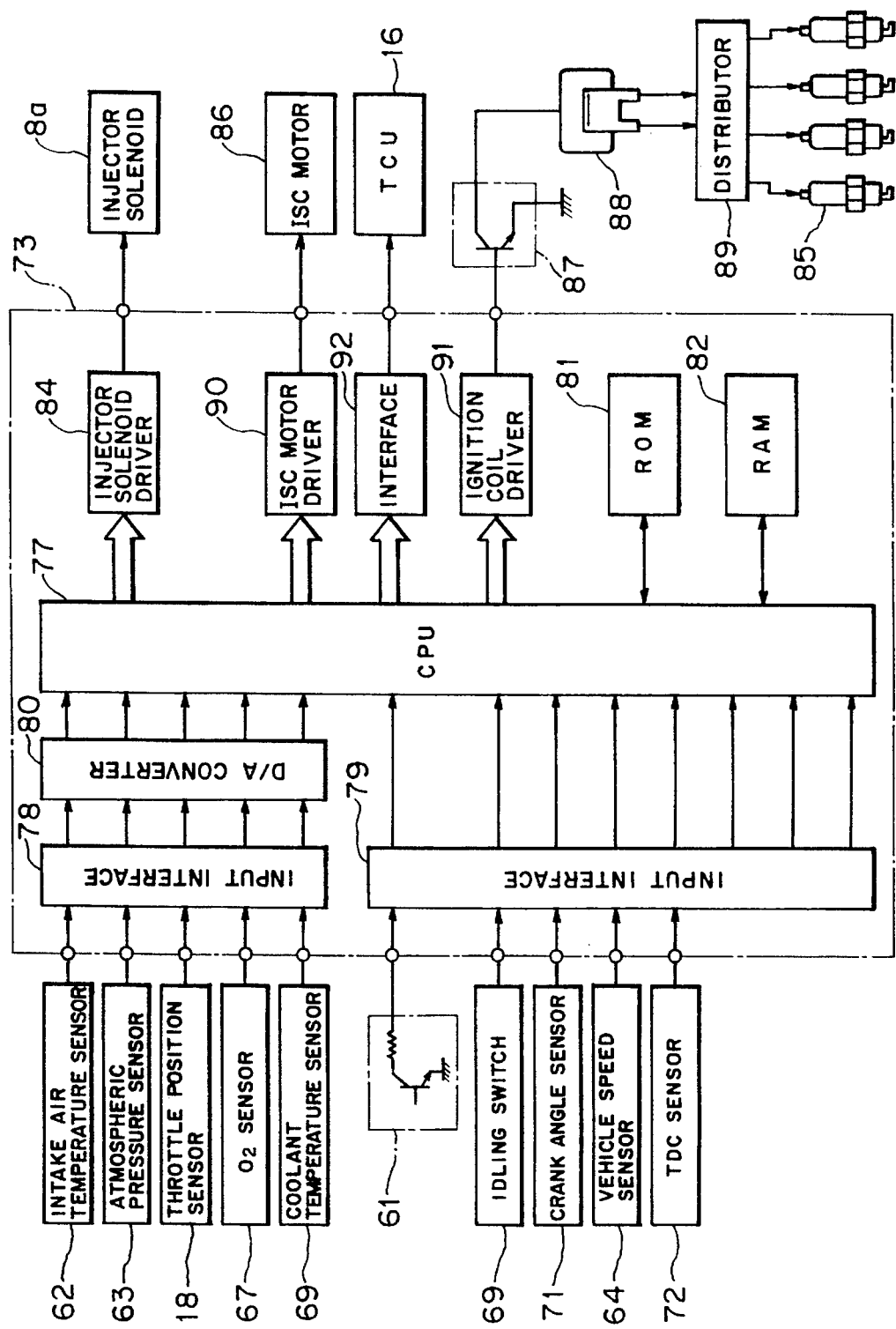
FIG. 17 is a block diagram of a control system suited for use in the practice of the control method according to the embodiment of the present invention for the vehicle engine arranged in association with the fluid coupling having the clutch.

Other sensors include a coolant temperature sensor 69 for detecting the temperature of coolant of the engine and as shown in FIG. 17, a crank angle sensor 71 for detecting a crank angle (which can also be used as a speed sensor for detecting an engine speed) and a TDC sensor (cylinder determining sensor) 72 for detecting the top dead center of a first cylinder (the reference cylinder), said crank angle sensor 71 and said TDC sensor being located in a distributor.

Detection signals from these sensors are inputted to an electronic control unit (ECU) 73 or TCU 16.

Also inputted to ECU 73 are a voltage signal from a battery sensor 75 for detecting a voltage of a battery, a signal from a cranking switch 70 or an ignition switch (key switch) for detecting a start-up, and a signal from a vehicle speed sensor 64.

These ECU 73 and TCU 16 mutually exchange information to perform control in coordination.

The hardware construction of ECU 73 can be illustrated as shown in FIG. 17. ECU 73 is provided as a principal component thereof with CPU 77. To CPU 77, detection signals from the intake air temperature sensor 62, the atmospheric pressure sensor 63, the $O_2$ sensor 67, the coolant temperature sensor 69 and the battery sensor 75 are inputted via an input interface 78 and an A/D converter 80, and also detection signals from the air flow sensor 61, the crank angle sensor 71, the TDC sensor 72, the idling switch 65, the cranking switch 70, the ignition switch (not shown), etc. via an input interface 79.

Further, CPU 77 is arranged to exchange data through bus lines with ROM 81 which stores program data and fixed value data, RAM 82 which can be updated, i.e., can be successively rewritten and a battery-backed-up RAM (not shown) which can hold stored information as long as connected to a battery, i.e., backed up by the battery. Whenever the ignition switch is turned off, the data of RAM 82 are erased to reset RAM 82.

As a result of computation by CPU 77, signals for controlling the state of operation of the engine 10 and the state of various accessories, for example, various control signals such as a fuel injection control signal, an idling speed control signal and an ignition timing control signal are outputted from ECU 73.

Of these control signals, the fuel injection control (air/fuel ratio control) signal is outputted from CPU 77 to an injector solenoid 8a (precisely, a transistor for the injector solenoid 8a) for driving the injector 8 via an injector solenoid driver 84. The ignition timing control signal, on the other hand, is outputted from CPU 77 to a power transistor 87 via an ignition coil driver 91, so that a current is fed from the power transistor 87 to the distributor 89 via an ignition coil 88 to make the individual spark plugs 85 spark successively. Further, the idling speed control signal is outputted from CPU 77 to the ISC motor 86 via a ISC motor driver 90. Incidentally, signals for coordinated control are exchanged between CPU 77 and TCU 16 through an interface 92.

Figure 18:
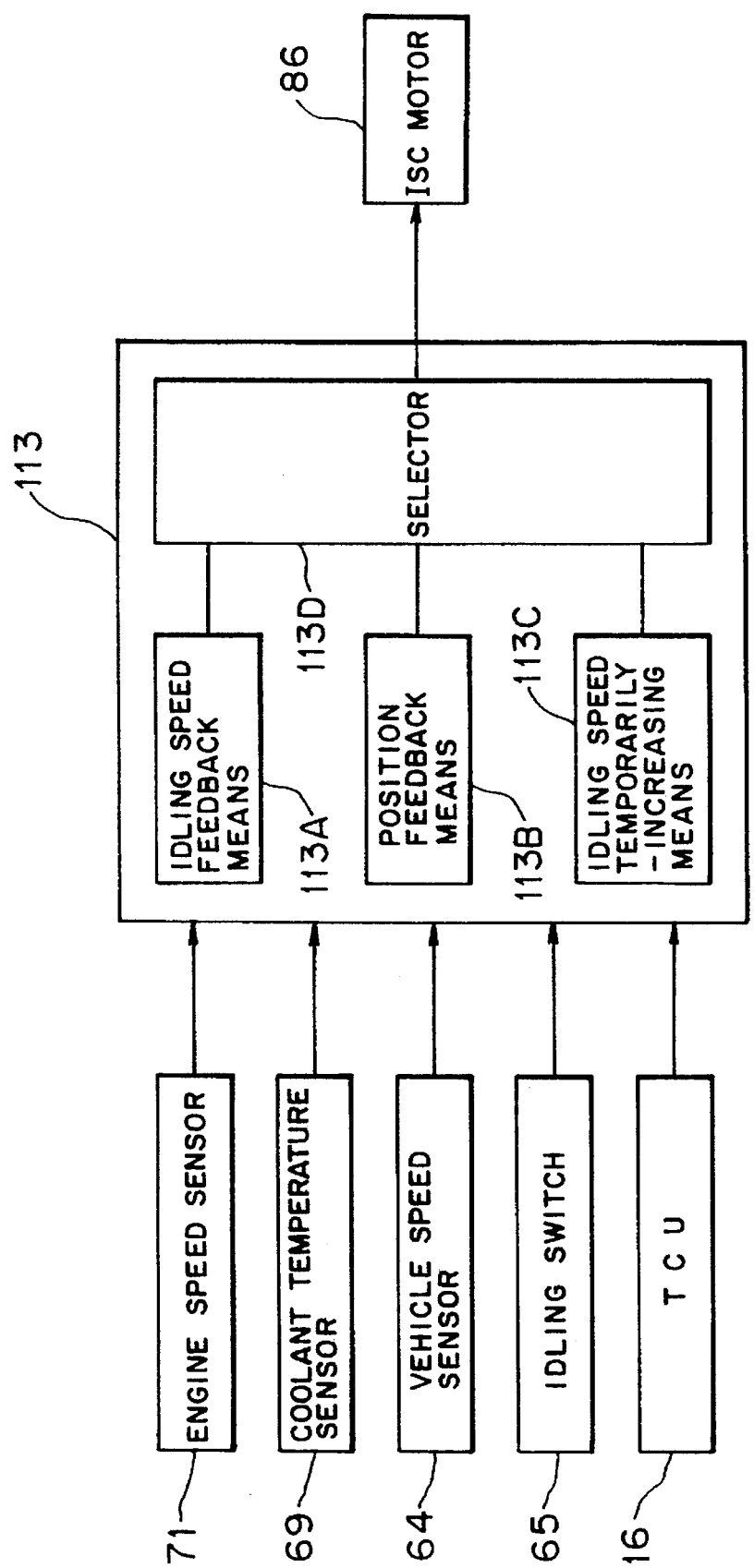
FIG. 18 is a block diagram of a control system suited for use in the practice of the control method according to the embodiment of the present invention for the vehicle engine arranged in association with the fluid coupling having the clutch, in which the control method is described by focusing on its idling speed control of the engine.

Focusing now on the idling speed control in the course of idling by the idling speed control system, ECU 73 is provided, as shown in FIG. 18, with an ISC control unit (idling speed control means) 113 to perform this idling speed control. This ISC control unit 113 has idling speed feedback means 113A, position feedback means 113B, idling speed temporarily-increasing means 113C and a selector 113D.

Here, the idling speed feedback means 113A controls the amount of air, which is to be fed to the engine 10, on the basis of a target engine speed NT set according to the state of idling operation of the engine (engine speed, coolant temperature, vehicle speed, etc.), so that feedback control is effected to control the engine speed NE at the target engine speed NT. The position feedback means 113B controls the amount of air, which is to be fed to the engine, on the basis of a target position of the ISC motor 86 set according to the state of idling operation of the engine (engine speed, coolant temperature, vehicle speed, electric load, etc.), so that the actual position (the actual throttle position or the actual ISC valve position) to be set by the ISC motor 86 is controlled to a target position (a target throttle position or target ISC valve position). To this end, the idling speed feedback means 113A is provided with a target valve position setting means for feeding back the idling speed and the position feedback means 113B is provided with a target valve position setting means for feeding back the position.

On the other hand, the idling speed temporarily-increasing means 113C serves to temporarily increase the idling engine speed by a predetermined degree when the idling engine speed drops in the course of a deceleration of the vehicle, so that any excess drop in the engine speed can be compensated. This idling speed temporarily-increasing means 113C constitutes first engine speed compensating means (engine speed compensating means).

The idling speed control by the idling speed control system is actuated upon detection of the ON state of the idling switch 65 and an idling state of the engine 10. First, information on the state of operation of the engine 10, for example, an engine speed NE from the crank angle sensor (engine speed sensor) 71, a coolant temperature (information on the state of temperature of the engine 10) from the coolant temperature sensor 69, vehicle speed information from the vehicle speed sensor 64 and ON/OFF signals from various switches of the accessories as well as an A/N ratio from the air flow sensor 61, an intake air temperature from the intake air temperature sensor 62, an atmospheric pressure from the atmospheric pressure sensor 63 and the like are read in CPU 77 of ECU 73.

Based on the vehicle speed information from the vehicle speed sensor 64 and the ON/OFF signals from various switches of the accessories, it is then determined if the vehicle is in an idling state at a stop, in an idling state under running or in an idling and accessories-actuated state. Where the vehicle is found to be in an idling state at a stop, the idling speed feedback control is selected. Where the vehicle is found to be in an idling state under running or in an idling state with an accessory such as an air conditioner in operation, on the other hand, the position feedback control is selected.

If the idling speed drops in the course of a deceleration of the vehicle, the idling engine speed is temporarily increased by a predetermined degree by the idling speed temporarily-increasing means 113C on a preferential basis over the control by the idling speed feedback means 113A or by the position feedback means 113B, whereby any excess drop in the engine speed is compensated. In this case, the control is performed following steps S221 to S236 in the flow charts shown in FIGS. 6 and 7.

As a consequence, even if the engine speed NE drops in the deceleration-time slip range and occurrence of an engine stall is hence expected, the engine speed NE is temporarily increased so that the operation under the deceleration-time direct connection control can be smoothly performed.

Incidentally, the selector 113D selectively outputs to the ISC motor 86 a control signal from one of the idling speed feedback means 113A, the position feedback means 113B and the idling speed temporarily-increasing means 113C.

Figure 19:
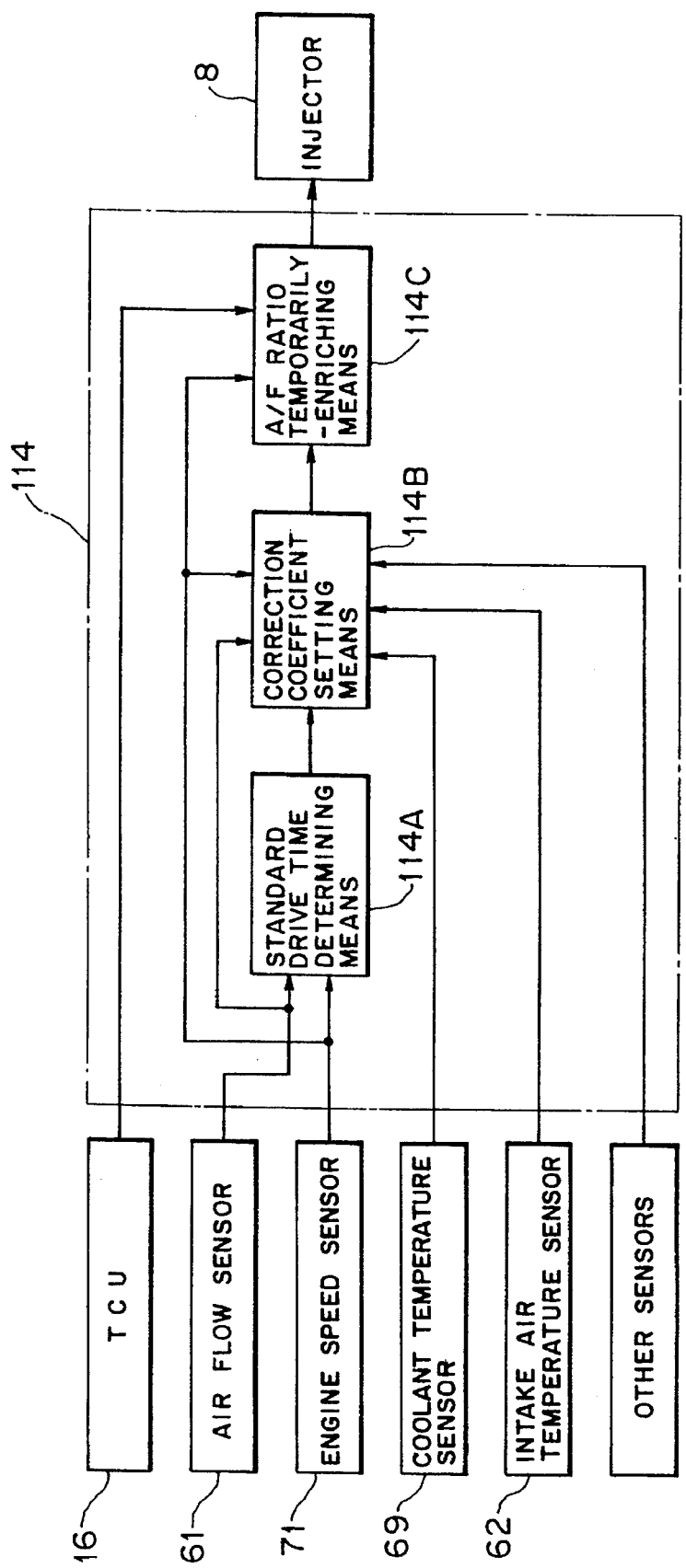
FIG. 19 is a block diagram of a control system suited for use in the practice of the control method according to the embodiment of the present invention for the vehicle engine arranged in association with the fluid coupling having the clutch, in which the control method is described by focusing on its air/fuel ratio control of the engine.

Focusing on the fuel injection control (air/fuel ratio control), ECU 73 is, as shown in FIG. 19, provided with a fuel injection control unit (air/fuel ratio control means) 114 to perform the fuel injection control (the injector drive time control). This fuel injection control unit 114 has, as illustrated in FIG. 19, a standard drive time determining means 114A, a correction coefficient setting means 114B and an air/fuel ratio temporarily-enriching means 114C.

The standard drive time determining means 114A determines the standard drive time $T_B$ for the injector 8. This standard drive time $T_B$ is determined as will be described next. Namely, information on an inducted air amount A/N per revolution of the engine is determined from information on an inducted air amount A from the air flow sensor 61 and information on an engine speed N from the crank angle sensor 71. Based on a standard pulse width set according to this information, the standard drive time $T_B$ is determined.

On the other hand, the correction coefficient setting means 114B sets correction coefficients K such as an air/fuel ratio correction coefficient, an $O_2$ feedback correction coefficient, a coolant temperature correction coefficient and an intake air temperature correction coefficient.

Further, the air/fuel ratio temporarily-enriching means 114C sets a deceleration-time enriching correction time $T_C$ (or a correction coefficient $K_C$) during which if the engine speed drops in the course of a deceleration of the vehicle, the air/fuel ratio is temporarily enriched by a predetermined degree to compensate any excess drop in the engine speed. This air/fuel ratio temporarily-enriching means 114C therefore constitutes second engine speed compensating means (engine speed compensating means). When the control is performed by these means, the control is performed following steps S321 to S336 in the flow charts shown in FIGS. 6 and 8.

Here again, even if the engine speed NE drops in the deceleration-time slip range and occurrence of an engine stall is hence expected, the engine speed NE is temporarily increased so that the operation under the deceleration-time direct connection control can be smoothly performed.

Incidentally, the fuel injection time $T_{inj}$ is determined by $T_B \times K + T_C$ or $T_B \times K \times K_C$.

The fuel injection control (air/fuel ratio control) is therefore performed by determining the above times and coefficient $T_B$, $T_C$ (or $K_C$) and K, computing the fuel injection time $T_{inj}$ and the driving the injector 8 for the time $T_{inj}$.

Figure 6:
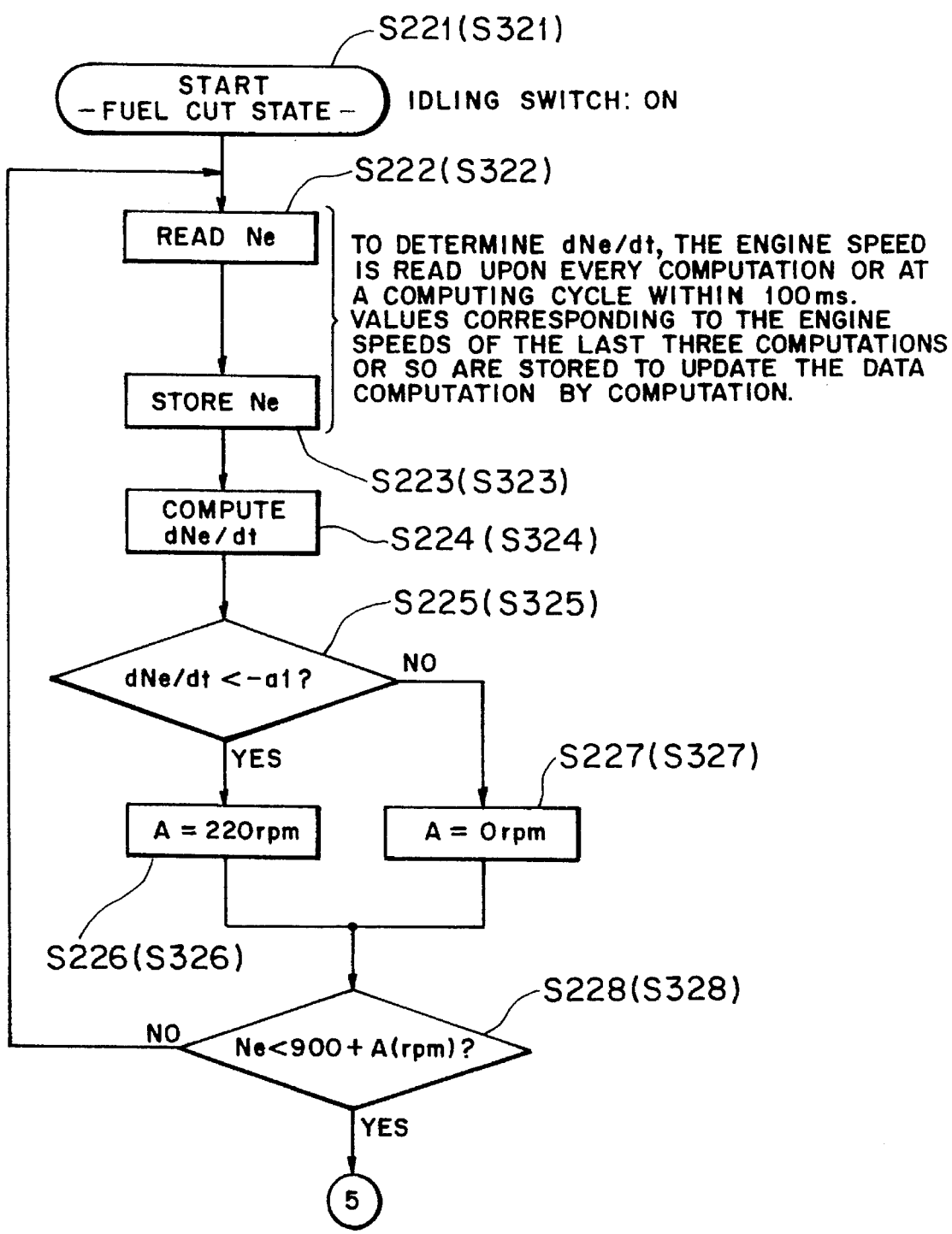
FIG. 6 is a flow chart of the control method according to the embodiment of the present invention for the vehicle engine arranged in association with the fluid coupling having the clutch.
Figure 7:
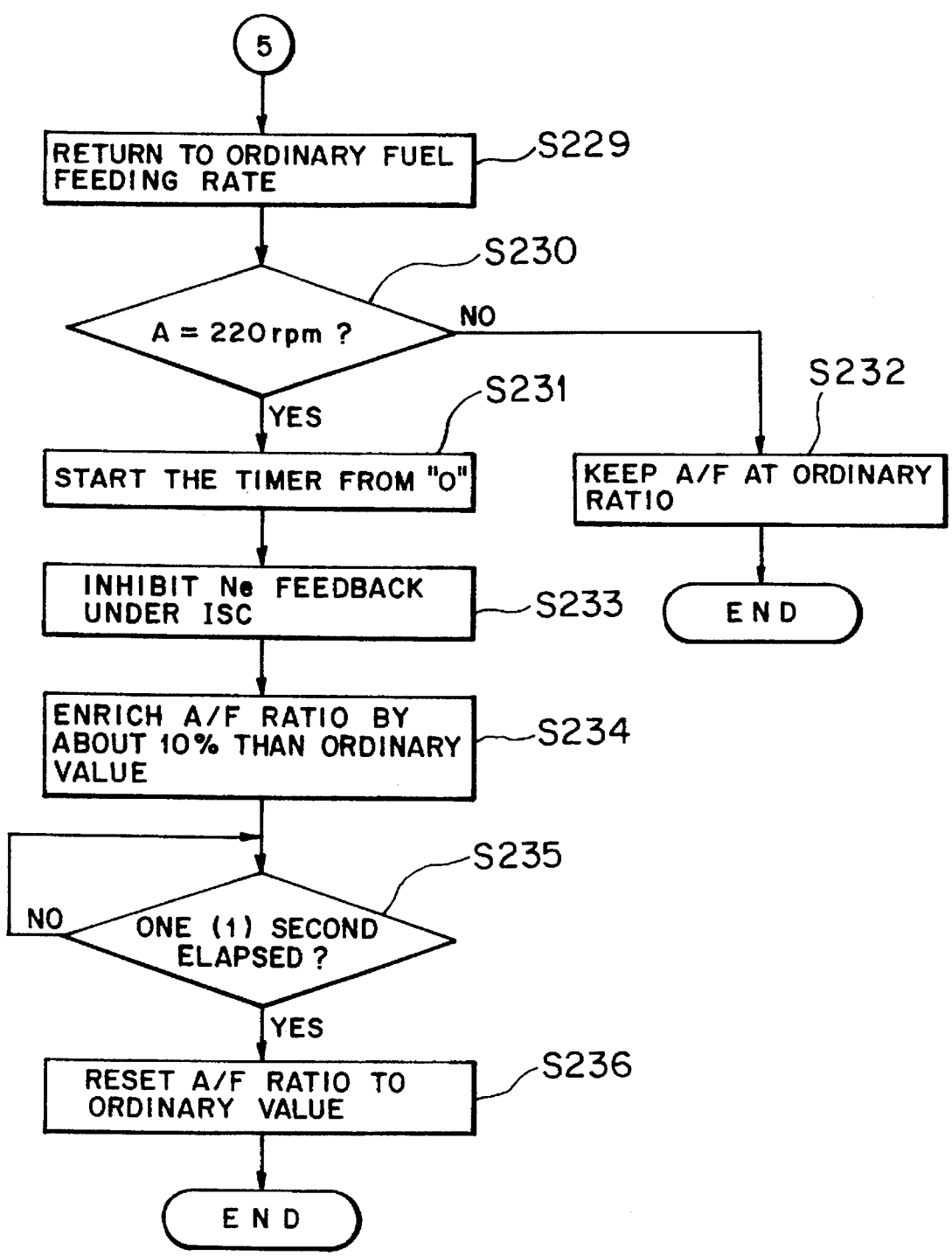
FIG. 7 is another flow chart of the control method according to the embodiment of the present invention for the vehicle engine arranged in association with the fluid coupling having the clutch.
Figure 8:
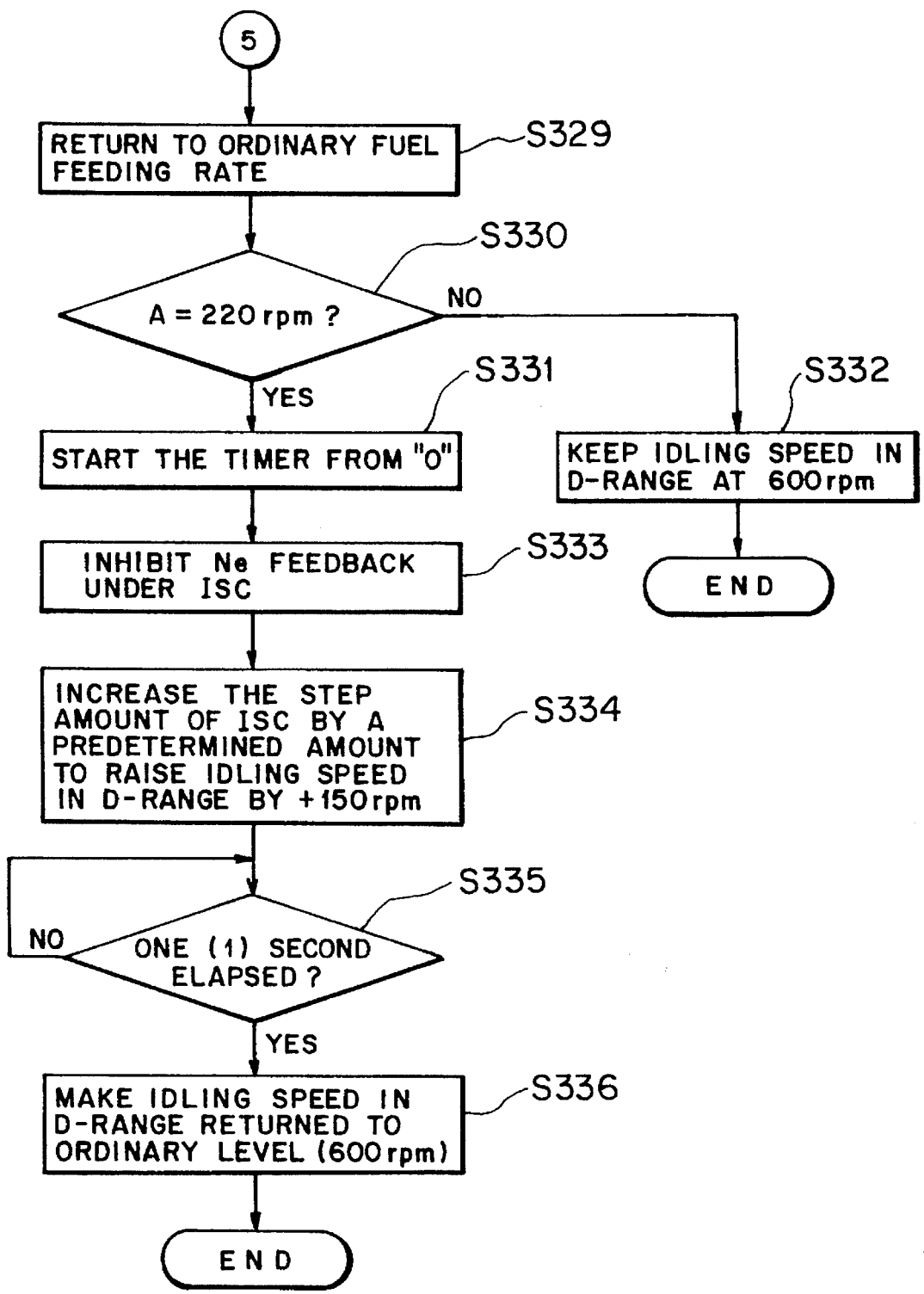
FIG. 8 is a further flow chart of the control method according to the embodiment of the present invention for the vehicle engine arranged in association with the fluid coupling having the clutch.

Since the idling speed temporarily-increasing means 113C and the air/fuel temporarily-enriching means 114C are both arranged as engine speed compensating means in this embodiment, the operations other than steps S234 and S334 in the flow charts shown in FIG. 6 to FIG. 8 are performed in common and the operations of steps S234 and S334 are also performed in parallel.

Because the engine control system and the clutch control system, which are employed to practice the control method according to the embodiment of the present invention for the vehicle engine arranged in association with the fluid coupling having the clutch, are constructed as described above, the engine control method and the clutch control method are performed as will be described next.

A description will first be made of effects of the control system for the automatic transmission, the torque converter and the clutch.

When the engine 10 is started, the main routine shown in the flow chart of FIG. 15 is executed as described above so that various data are calculated in every computing cycle and predetermined operations including shifting of the speed stage are performed.

In the construction illustrated in FIGS. 1 and 2, the torque converter 20 connected to the output shaft of the engine 10 and the damper clutch 28 arranged in association with the torque converter 20 to permit solid connection between the input side and the output side of the torque converter 20 are controlled by the control system composed of TCU 16 and the damper clutch hydraulic pressure control circuit 50.

Where a running state of an automotive vehicle is, for example, in the non-slip direct connection range shown in FIG. 9, the non-slip direct connection control means 101 is actuated so that the damper clutch control solenoid valve 54 in the damper clutch hydraulic pressure control circuit 50 is driven by a control signal from TCU 16 to change over the damper clutch control valve 52 and the line pressure of the line 58 is fed through the line 59 as an apply pressure for directly connecting the damper clutch 28.

At this time, the line 57 is communicated to an oil discharging side so that the working oil on the release side of the damper clutch 28 is discharged.

As a result, the damper clutch 28 is brought into a solid connection state by the non-slip direction control means 101 and the drive force of the internal combustion engine 10 is transmitted to a side of driven wheels primarily via the damper clutch 28.

In this state, a fuel cut (i.e., reduction) corresponding to an energy loss which would otherwise occur if the transmission of the drive force is performed via the torque converter 20 is conducted by the control system for the internal combustion engine 10, resulting in saving of fuel consumption.

Where a running state of the automotive vehicle is in the non-direct connection range in FIG. 9, the non-direct connection range control means 102 is actuated so that the damper clutch control solenoid valve 54 in the damper clutch hydraulic pressure control circuit 50 is driven by a control signal from TCU 16 to change over the damper clutch control valve 52 and the line pressure of the line 58 is fed through the line 57 as a release pressure for bringing the damper clutch 28 into a non-direct connection state.

At this time, the line 59 is communicated to the oil discharging side so that the working oil on the apply side of the damper clutch 28 is discharged.

As a result, the damper clutch 28 is brought into a non-direct connection state by the non-direct connection control means 102 and the drive force of the internal combustion engine 10 is transmitted to the side of the driven wheel primarily via the torque converter 20.

Since drive of the damper clutch control solenoid valve 54 is conducted at a predetermined duty ratio in response to a control signal from TCU 16, the damper clutch control valve 52 feeds the line pressure of the line 58 at predetermined pressures to the lines 57,59 so that the working pressure to be fed to the damper clutch 28 is regulated.

Here, the apply pressure in the non-slip direct connection control means 101 corresponds to 100% duty ratio or its proximal state while the apply pressure in the non-direct connection range control means 102 corresponds to a duty ratio of 0–30%.

Where a running state of the automotive vehicle is in the slip range shown in FIG. 9, on the other hand, a predetermined apply pressure is applied to the damper clutch 28 owing to an adjustment to the duty ratio on the basis of a control signal from TCU 16, whereby the damper clutch 28 is brought into a desired slipping state.

As a result, the drive power of the internal combustion engine 10 is transmitted to the side of the driven wheels through both the damper clutch 28 and the torque converter 20.

In this state, a fuel cut (i.e., reduction) corresponding to drive power which is no longer transmitted through the torque converter 20 because of the transmission of the drive power through the damper clutch 28 is conducted by the control system for the internal combustion system 10. The fuel consumption is therefore reduced.

Figure 3:
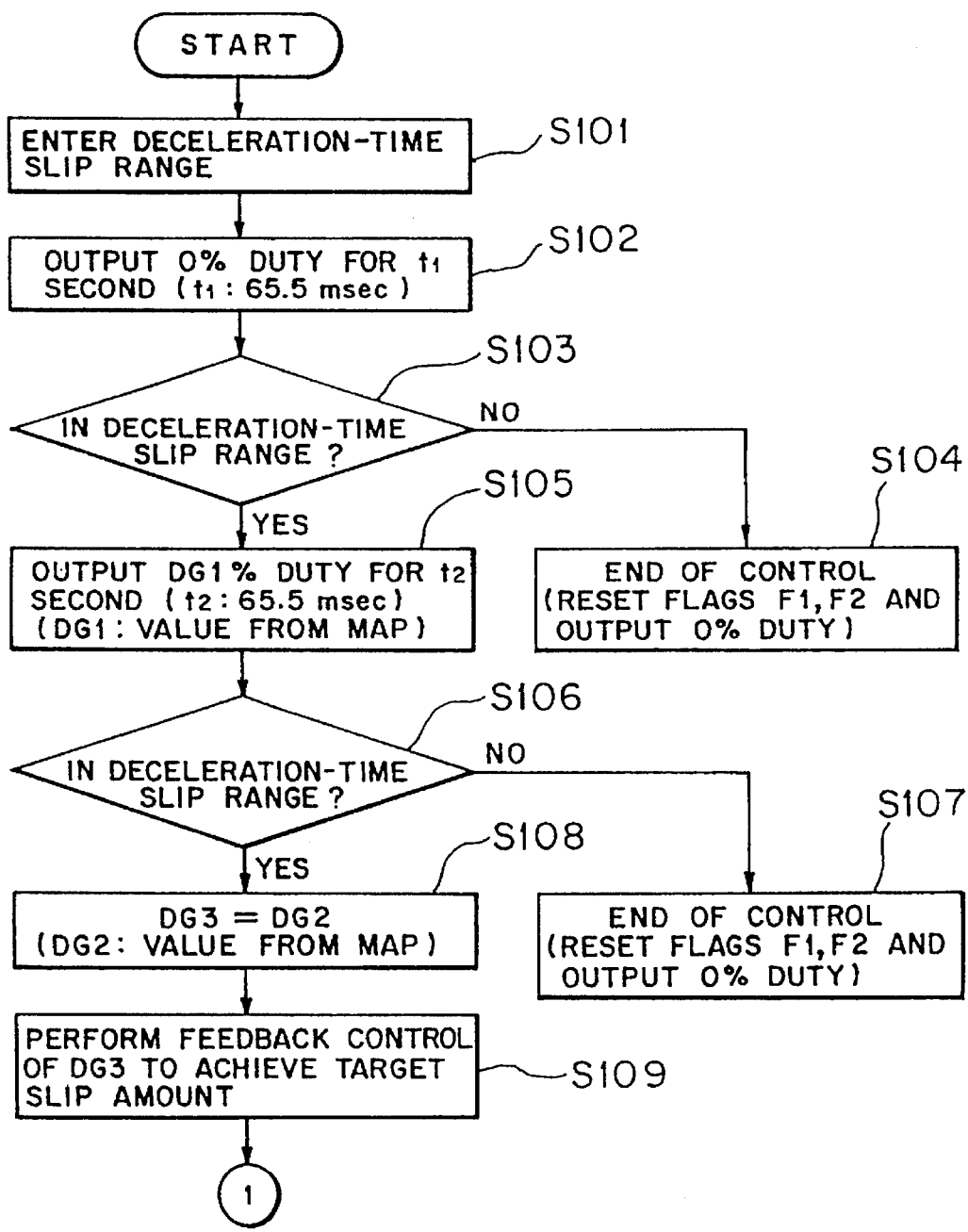
FIG. 3 is a flow chart of the clutch control of the control method according to the embodiment of the present invention for the vehicle engine arranged in association with the fluid coupling having the clutch, for deceleration-time slip control.
Figure 4:
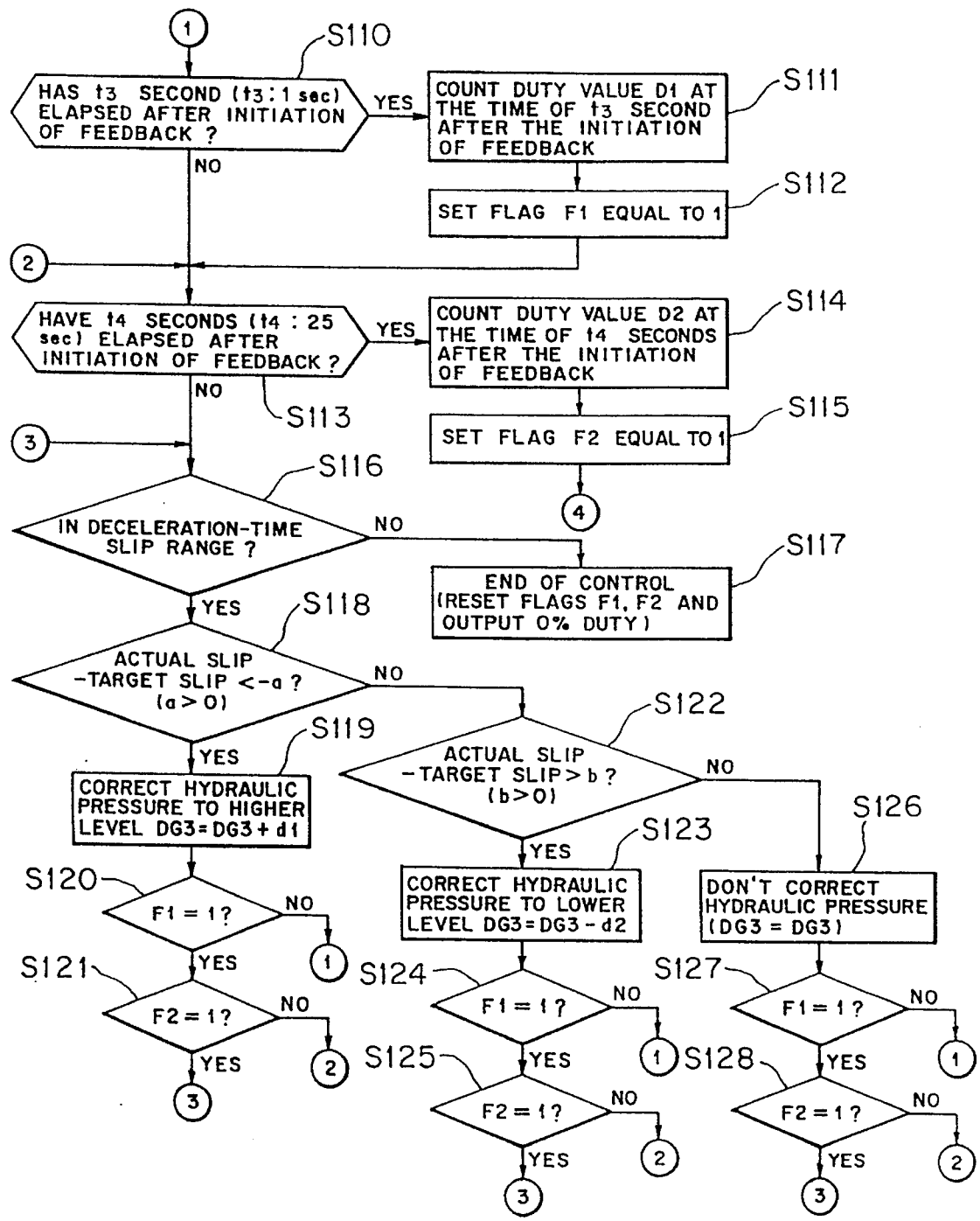
FIG. 4 is another flow chart of the clutch control of the control method according to the embodiment of the present invention for the vehicle engine arranged in association with the fluid coupling having the clutch, for deceleration-time slip control.
Figure 5:
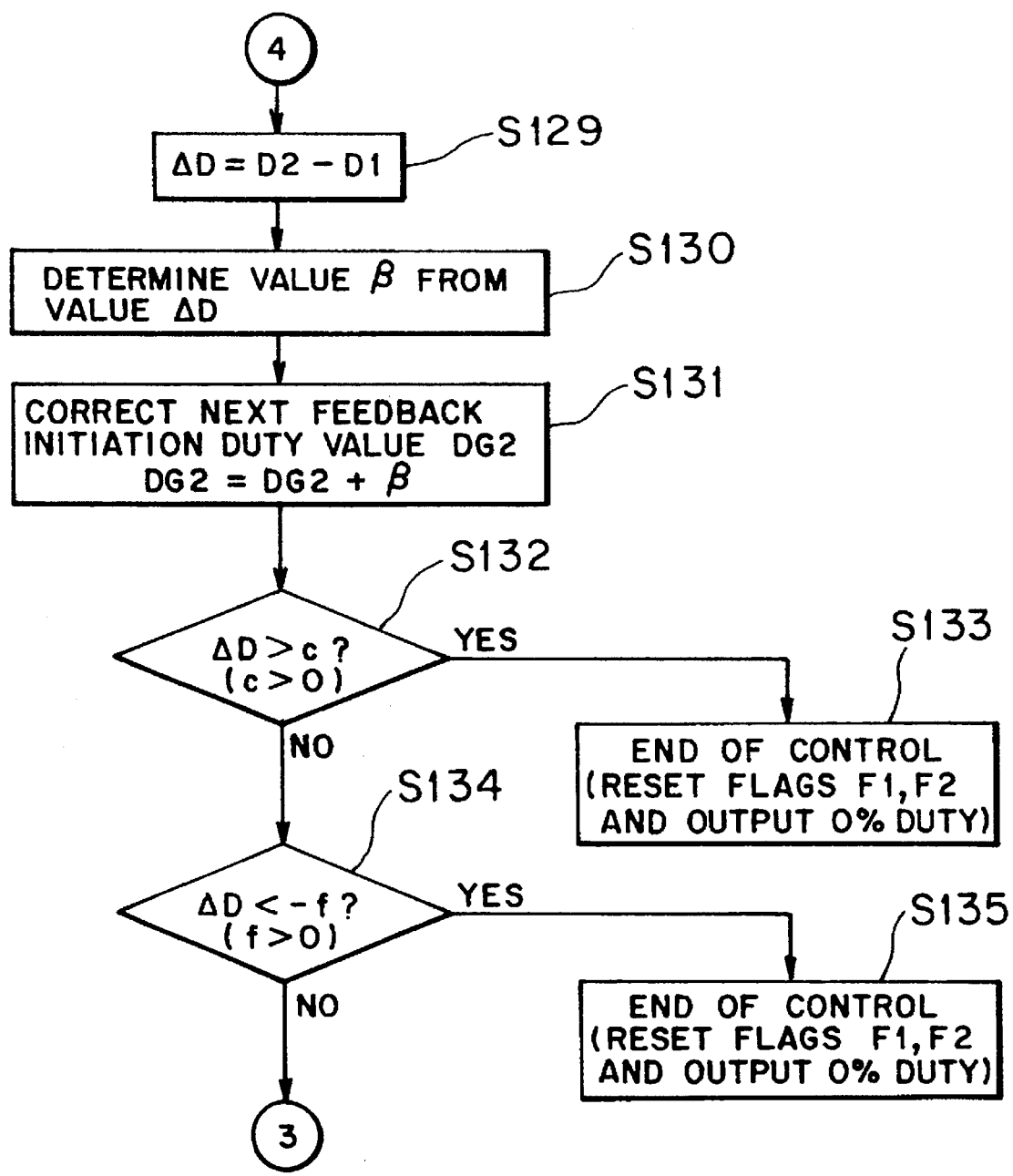
FIG. 5 is a further flow chart of the clutch control of the control method according to the embodiment of the present invention for the vehicle engine arranged in association with the fluid coupling having the clutch, for deceleration-time slip control.

During decelerated operation of the automotive vehicle, the deceleration-time slip range control under which the damper clutch 28 is controlled in a desired slipping state is performed by the deceleration-time slip control means 103 in accordance with the flow charts shown in FIGS. 3 to 5.

First, when entrance to the deceleration-time slip range is detected as a result of determination of the operation range (step S101), the transition-time control means 104 is then actuated upon changing the control to the deceleration-time slip range control, so that deceleration-time clutch control is performed.

Incidentally, the determination of the operation range is conducted based on a turbine speed NT of the turbine 25 and a throttle position θT of the internal combustion engine 10 detected by the NT sensor 15 and the θT sensor 18, respectively, and inputted to TCU 16 while referring to the characteristics of FIG. 9 stored in TCU 16.

To operate the damper clutch 28 through a non-direct connection state by the non-direct connection state routing means 105, a control signal for setting at 0% duty ratio an apply pressure to be fed to the damper clutch 28 is outputted from TCU 16 to the damper clutch hydraulic pressure control circuit 50 for $t_1$ second from the entrance to the deceleration-time slip range (step S102).

For example, $t_1$ second may be set equal to the time period required for a single computing cycle.

As an alternative, $t_1$ second may also be set equal to the time period required for releasing the clutch at 0% duty ratio on the basis of the operation state of the vehicle immediately before entrance to the decelerated operation.

An operation state of the vehicle can be determined, for example, by a slip amount ($N_E$ - $N_T$) and an engine load such as a throttle position. The time $t_1$ is determined in accordance with their amounts.

Upon changing the operation state, for example, to the deceleration-time slip range from the direct connection range where the direct connecting pressure is high, a shock can be avoided by making the time $t_1$ longer.

As a further alternative, the setting of this time $t_1$ can also be conducted using a map which permits determination of the time $t_1$ in accordance with the slip amount and the engine load.

As a result, the apply pressure to the damper clutch 28 is maintained at 0% duty ratio as shown in zone A in FIG. 10.

Under this non-direct connection state in zone A, a change in torque upon deceleration of the engine 10 is absorbed.

When the vehicle is brought into a decelerated state from a state in which the vehicle is running with the damper clutch 28 directly connected with or without slipping, the throttle position θT of the internal combustion engine 10 is returned to the fully-closed position and the damper clutch 28 is brought into the deceleration-time slip state. The vehicle is hence operated in such a way that the side of the engine 10 is driven by the side of the driven wheels, thereby making it possible to reduce the fuel to be fed to the engine 10.

When the throttle position θT is returned to the fully-closed position, however, a change in torque takes place in the output from the internal combustion engine 10 and this change is directly transmitted to the gear-box 30 through the turbine 25. A shock or judder therefore occurs.

The change to the deceleration-time slip mode cannot therefore be performed smoothly, leading to a failure in achieving the deceleration-time slip control. Under the non-direct connection state in zone A, however, a change in torque upon deceleration of the engine 10 can be absorbed so that transmission of the change to the gear-box 30 can be avoided.

As a result of the operation through the non-direct connection state by the non-direct connection state routing means 105, it is now possible to smoothly achieve the change to the deceleration-time slip mode. Deceleration-time slip control can therefore be performed.

The non-direct connection state created by the non-direct connection state routing means 105 is then eliminated in an early stage by the transition-time non-direct connection eliminating means 105.

This can be effected by performing step S105 with the use of the non-direct connection state routing means 105 after confirming in step S103 of the control flow of TCU 16 if the vehicle is in the deceleration-time slip range.

Described specifically, a tightening hydraulic pressure DG1 is set by the tightening hydraulic pressure setting means 108 of the transition-time non-direct connection eliminating means 105 while relying upon a turbine speed NT of the torque converter 20 and a throttle position θT of the engine 10 at the time of the entrance to the deceleration-time slip range.

This is conducted by choosing one of the divided characteristics A1 to A16 of FIG. 11, which are stored in TCU 16, based on the turbine speed NT of the torque converter 20 and the throttle position θT of the engine 10 at the time of the entrance to the deceleration-time slip range and then reading as the tightening hydraulic pressure DG1 the characteristic value the so-selected divided characteristics from the memory.

The tightening hydraulic pressure DG1 so set is fed by the tightening hydraulic pressure feeding means 107 to directly connect the damper clutch 28.

As is shown in zone B of FIG. 10, the apply pressure to the damper clutch 28 is held at a hydraulic pressure corresponding to the duty ratio DG1 for $t_2$ second.

This duty ratio DG1 is set at a value capable of promptly eliminating the non-direct connection state achieved by the non-direct connection state routing means 105, and is dependent on the state immediately before the entrance to the deceleration-time slip range.

For a tightening hydraulic pressure DG1 corresponding, for example, to a change from a section in the non-slip direct connection range, in which section the throttle position θT is large and the turbine speed NT is also high, the duty ratio of an upper right section as viewed in FIG. 11 is set smaller than that of a lower left section in view of a residual pressure on the apply side.

A tightening hydraulic pressure DG1 corresponding to a change from a non-direct connection range is generally large because the pressure in the damper clutch 28 is basically low, and is set at a larger value as the change is from a section of a smaller value in the throttle position θT.

Operation by the transition-time control means 104 is performed as described above, and the feedback control by the deceleration-time slip range control means 103 is next initiated.

In step S108 of the control flow for TCU 16, the feedback initiating hydraulic pressure 109 is first set relying upon a turbine speed NT of the torque converter 20 and a throttle position θT of the engine 10 as detected at the time of entrance to the deceleration-time slip range.

This is conducted by selecting one of the divided characteristics B1 to B16 of FIG. 12, which have been stored in TCU 16, on the basis of the turbine speed NT of the torque converter 20 and the throttle position θT of the engine 10 as detected at the time of the entrance to the deceleration-time slip range and then reading, as a duty ratio DG2 of the feedback control initiation hydraulic pressure, the characteristic value of the so-selected divided characteristics from the memory.

The thus-set duty ratio DG2 of the feedback control initiating hydraulic pressure is adjusted by a control signal from TCU 16 and then fed to directly connect the damper clutch 28, whereby the feedback control in zone C shown in FIG. 10 is initiated.

From the non-direct connection state achieved by the non-direct connection state routing means 105 and the results of control by the transition-time non-direct connection eliminating means 106, the duty ratio DG2 of this feedback control initiating hydraulic pressure is set to smoothly bring the subsequent feedback control into a converged state. The the duty ratio DG2 is dependent on the state immediately before the entrance to the deceleration-time slip range.

In view of a residual pressure still remaining on the apply side, a feedback control initiating hydraulic pressure DG2 corresponding to a change from the non-slip direct connection range of the section B15 or B16 where the throttle position θT is large and the turbine speed NT is also high is set greater than a feedback control initiating hydraulic pressure DG2 corresponding to a change from the non-direct connection range of the section B13 or B14 where the turbine speed NT is low.

The feedback control of the damper clutch 28 is initiated in this manner. To avoid occurrence of a stall or a shock during this control, it is determined by the initiating hydraulic pressure determining means 110 if the feedback control initiating hydraulic pressure DG2 is too high or too low. Based on the results of the determination by the initiating hydraulic pressure determining means 110, correction of the next feedback control initiating hydraulic pressure DG2 is conducted by the initiating hydraulic pressure correcting means 112.

Where occurrence of a shock is expected based on the results of a determination by the initiating hydraulic pressure determining means 110, on the other hand, the feedback control is interrupted by the feedback interrupting means 111.

This will hereinafter be described specifically. In the control flow of TCU 16, the duty ratio DG2 of the feedback control initiating hydraulic pressure in the current control cycle is first read in step S108 as DG3 for use as a variable upon making a correction subsequently.

As will be described subsequently herein, the duty ratio DG2 is corrected through learning but the correction value β is stored separately. Accordingly, the correction value β is read concurrently with reading of DG2 as DG3 and DG3 is set as a learned value.

By executing step S109 onwards, the feedback control of the duty ratio DG3 is then performed to make the slip amount of the damper clutch 28 closer to a target value.

Namely, it is determined in step S118 whether or not the actual slip amount at the damper clutch 28 is smaller than the target slip amount by a predetermined value "-a" (a>0), in other words, whether or not the actual slip amount is smaller than a level which is smaller by "a" than the target slip amount. If so, step S119 is executed to effect a correction to the duty ratio DG3 under the feedback control so that the duty ratio DG3 is increased by a predetermined value d1.

On the other hand, it is determined in step S122 whether or not the actual slip amount at the damper clutch 28 is greater than the target slip amount by a predetermined amount "b" (b>0). If so, step S123 is executed to effect a correction to the duty ratio DG3 under the feedback control so that the duty ratio DG3 is decreased by a predetermined value d2.

Where the actual slip amount falls in a predetermined up-and-down range of the target slip amount (i.e., in a range from a level smaller by the predetermined value "a" to a level greater by the predetermined value "b"), the routine advances taking the "NO" route in each of step S118 and step S122 and without effecting any correction in step S126 to the duty ratio DG3 under the feedback control, returns to step S116 through a branch route ③ and operations similar to the preceding feedback control are repeated.

Where the duty ratio DG3 under the feedback control is corrected in step S119 or step S122, on the other hand, the duty ratio DG3 so corrected is outputted to the damper clutch hydraulic pressure control circuit 50 so that a corrected apply pressure is fed to the damper clutch 28. Even if the duty ratio DG3 under feedback control is not corrected in step S126, the duty ratio DG3 is of course outputted to the damper clutch hydraulic pressure control circuit 50 so that a corrected apply pressure is fed to the damper clutch 28.

The routine advances through step S120, step S121, S124, step S125, step S127 and step S128 and then returns to step S116 through the branch route ③, whereby the determinations in step S118 and S122 and the corrections to the duty ratio DG3 in steps S119, S123 and S126 are performed repeatedly.

Where the answer is "NO", in other words, flag F1≠1 in each of step S120, step S124 and step S127, the routine returns to step S110 through a branch route ①. Where the answer is "NO", namely, F1≠1 in each of step S121, step S125 and step S128, the routine returns to step S113 through a branch route ②.

When the vehicle is no longer in the deceleration-time slip range, the routine takes the "NO" route in step S116 and the feedback control is completed (steps S117, S104 and S107). This applies equally to steps S103 and S106.

The feedback control of the damper clutch 28 is performed as described above. To avoid occurrence of a stall or shock in the course of the control, it is determined by the initiating hydraulic pressure determining means 110 if the feedback control initiating hydraulic pressure DG2 is too high or too low.

Namely, the initiating hydraulic pressure determining means 110 performs the following operations in accordance with the control flow of TCU 16.

First, it is repeatedly determined in step S110 whether or not a predetermined time $t_3$ (for example, $t_3=1$ second) has elapsed from the initiation of the feedback control. The duty ratio D1 immediately after the elapse is counted (step S111), and flag F1 which indicates counting of the duty ratio D1 is set at "1" (step S112).

Further, it is repeatedly determined in step S113 whether or not a predetermined time $t_4$ (for example, $t_4=2.5$ seconds) has elapsed from the initiation of the feedback control. The duty ratio D2 immediately after the elapse is counted (step S114), and flag F2 which indicates counting of the duty ratio D2 is set at "1" (step S115).

These duty ratios D1,D2 so counted correspond to the duty ratios at points S1,S2 shown in FIG. 13 and are adopted as characteristic values indicating the progress of the feedback control.

After completion of the counting of the duty ratio D2, the routine returns through a branch route ④ to execute step S129 shown in FIG. 5.

The change ΔD (=D2–D1) from the duty ratio D1 to the duty ratio D2 is calculated in step S129 to determine if the feedback control initiating hydraulic pressure DG2 is too high or too low.

Based on the deviation of the change ΔD in the duty ratio, a correction value β is read from the map, which stores the characteristics of FIG. 14, for use in the correction of the feedback control initiating hydraulic pressure DG2 in the next feedback control (step S130).

In step S131 which is executed by the initiating hydraulic pressure correcting means 112, the correction value β is added to the duty ratio DG2 of the feedback control initiating hydraulic pressure in the current feedback control so that the duty ratio DG2 (=DG2+β) of the feedback control initiating hydraulic pressure for the next feedback control is determined.

As a consequence, a control signal is outputted from TCU 16 to the damper clutch hydraulic pressure control circuit 50 and upon initiation of the next feedback control, an apply pressure corresponding to the duty ratio DG2 so corrected is fed to the damper clutch 28.

Since the duty ratio DG2 is a so-called map value preset in the memory as described above, the correction value β is not written directly in the map but is retained in another memory arranged to store the correction value β.

In the present embodiment, the correction value β for the predetermined duty ratio DG2 is determined and is also applied to all duty ratios DG2. It is however possible to compute and set a correction value for each duty ratio.

Accordingly, the feedback control initiating duty ratio DG2(n) for the $n^{th}$ deceleration-time slip control is expressed by the above formula (5).

By the above-described correction, the following advantageous effects can be brought about.

The characteristics of the correction value β in FIG. 14 comprise stepwise characteristics such that for a given change ΔD in the duty ratio, a correction value β is set at a value smaller than a correction value which would be obtained if the correction value β had linear characteristics (i.e., the characteristics extending from point O to point Z in FIG. 14).

Where the change ΔD in the duty ratio is 0.4% or greater but is smaller than 1.2%, for example, the correction amount β is set at 0.4% so that compared with a duty ratio change ΔD close to 1.2%, the correction amount so set is smaller by about 0.8%.

Assume that the hydraulic pressure on the apply pressure side in the above feedback control has become higher, for example, by 5% or more than a hydraulic pressure to be converged in the feedback control. If sudden brakes are applied on a low-μ road at this time point, release of a direct connection state of the damper clutch 28 is delayed and the engine speed NE is lowered, resulting in the potential problem that the engine may stall. The correction value β is however set at a smaller value so that the apply pressure is controlled lower, thereby making it possible to avoid occurrence of a stall or shock.

As is understood from the setting of the duty ratio D2 at point S0 shown in FIG. 13, the duty ratio DG2 of the feedback control initiating hydraulic pressure is set lower than that of a hydraulic pressure to be converged and is designed in such a way that the apply pressure gradually increases by the subsequent feedback control. It is therefore always possible to obtain the advantage that the above-mentioned apply pressure is controlled low and occurrence of a stall or shock is prevented.

Where the change ΔD in the duty ratio is found to be greater than a predetermined value "c" (c>0) or smaller than a predetermined value "–f" (f>0) by the feedback control interrupting means 111 in steps S132 and S134, the feedback control is however interrupted (steps S133 and S135).

If the working hydraulic pressure drops beyond a necessary value or despite the respective controls described above, becomes too high in the feedback control, the feedback control is therefore interrupted so that occurrence of a shock in the drive system or occurrence of a stall is prevented.

When the working hydraulic pressure in the feedback control becomes lower in duty ratio by 5% or more than a hydraulic pressure to be converged, the control is initiated from the non-direct connection range. The engine speed NE is therefore progressively lowered, resulting in the potential problem that a reduction in the amount of fuel to be fed to the engine may be stopped.

Further, the feedback-controlled hydraulic pressure becomes higher by an increase in the slip amount, leading to the potential problem that a shock may be produced.

Such a shock takes place at least 10 seconds after initiation of the feedback control. When the change ΔD in the duty ratio at the point S2 is equal to or greater than a predetermined pressure and further continuation of the control in the same manner is found to produce such a shock, the feedback control interrupting means 111 interrupts the feedback control in a sufficiently short time so that the control is changed to the control by the non-direct connection range control means 102. As a result, occurrence of such a shock is prevented.

It is also possible to overcome the problem which is caused by the performance of the feedback control in the deceleration-time slip range at a hydraulic pressure as low as about 0.5 kg/cm$^2$.

To permit prompt release of the direct connection of the damper clutch 28 as needed, a sufficient release pressure is indispensable. Because the release of the direct connection state is conducted under such situations that the working pressure in the whole control system is low and the release pressure for the damper clutch 28 is also low, it takes long time to release the direct connection state even if an excess in the pressure of the working oil is as small as an overshoot in the feedback control.

This can also be attributed to the circumstance that the release pressure fed from the pump driven by the internal combustion engine 10 as a drive source cannot be increased promptly because the supply of fuel to the internal combustion engine 10 has also been reduced by the deceleration-time slip range control.

If the direct connection is not fully released despite application of brakes to promptly reduce the revolution speed on the side of the wheels, the brake force is transmitted to the side of the internal combustion engine 10 and may stall the internal combustion engine 10.

To cope with this potential problem, the working hydraulic pressure in the feedback control is controlled to approach from a lower side toward the hydraulic pressure to be converged in the feedback control like the progress of the control shown in FIG. 13. This makes it possible to avoid an engine stall.

As means for avoiding such a situation that because of a delay in releasing the direct connection of the damper clutch 28 upon sudden braking on a low μ road, the engine speed NE is lowered and an engine stall is hence caused, operations for temporarily compensating the engine speed by the engine speed compensating means are performed following the flow charts in FIG. 6 to FIG. 8.

FIGS. 6 and 7 show flow charts where the idling speed temporarily increasing means 113C is employed as the engine speed compensating means. First, when a fuel cut state arises in the course of the control in the deceleration-time slip range, the idling switch 65 is turned on so that the ISC control by ECU 73 via the ISC motor 86 is initiated (step S221). Incidentally, the fuel cut state which is a prerequisite for the initiation of this control can be created when the vehicle is running with the damper clutch 28 set in a direct connection state or a slippable direct connection state as described above. The state of engagement that the damper clutch 28 in the direct connection state or the slippable direct connection state can therefore be said as a prerequisite for the initiation of the control.

Then, the engine speed NE is read (step S222) and the current engine speed NE is stored (step S223).

The engine speed NE is read per computation or at a computing cycle not longer than 100 ms. Values for the last three computations or cycles or so are stored and are updated whenever a new value is read.

Thereafter, the rate of change dNE/dt of the engine speed NE is computed (step S224), followed by determination as to whether the vehicle is in the decelerated state that the rate of change is greater than a predetermined value –a1 (a1: constant) (step S225). Here, the predetermined value –a1 is set at such a threshold value that an engine stall will eventually takes place if the state continues as is.

If the deceleration is found to be greater than a predetermined value in step S225, the reference value A is set, for example, at 220 rpm (step S226), followed by the determination in step S228.

Described specifically, it is determined if the engine speed NE is lower than 1120 rpm (900+220). If not, under the judgment that no engine stall is expected owing to the high engine speed despite the large deceleration, the routine returns to step S222 and the operations in the next cycle are repeated.

If the deceleration is not found to be greater than the predetermined value in step S225, the reference value A is set at 0 rpm (step S227), followed by the determination in step S228.

Described specifically, it is determined if the engine speed NE is lower than 900 rpm (=900+0). If not, under the judgment that an idling speed is maintained with the deceleration not greater than the predetermined value, hence, in a state not decelerated too much, the routine returns to step S222 and the operations in the next cycle are repeated.

If the deceleration is found to be greater than the predetermined value and the engine speed NE is found to be lower than 1120 rpm, or if the engine speed NE is found to be lower than 900 rpm although the deceleration is not greater than the predetermined value, there is the potential problem of an engine stall. In step S229 of FIG. 7, the fuel cut is stopped and the feeding rate of fuel returns to an ordinary rate.

Next, step S230 is executed. If the set value A is determined not to be 220 rpm in this step, the deceleration of the engine is not greater than the predetermined value so that by the return to the ordinary fuel feeding rate in step S229, the engine speed NE is not lowered abruptly. The idling speed is therefore set at the ordinary value (600 rpm) in the drive range (D-range) in step S232, followed by normal ISC control.

If the set value A is determined to be 220 rpm in step S230, on the other hand, this indicates that the deceleration of the engine is greater than the predetermined value. Accordingly, the engine speed NE may then drop abruptly even if the feeding of fuel is returned to the ordinary rate in step S229. To cope with this potential problem, operations by the idling speed temporarily-increasing means 116 as the engine speed compensating means 115, said operations being described in step S231 onwards, are performed.

Namely, a timer is started to count a time during which the idling speed is increased (step S231).

To avoid any interference with subsequent operations, the feedback control of the engine speed NE by the ISC control is inhibited (step S233).

The number of steps in the ISC control is then increased by a predetermined number to increase the idling speed in the D-range, for example, by 150 rpm and the ISC control is performed to reach the thus-increased idling speed as a target idling speed (step S234). Described specifically, the amount of inducted air is increased by a predetermined degree by the idling speed control means 113 so that the engine output is increased.

As a consequence, the control toward the target idling speed increased by 150 rpm is performed precisely so that the engine speed NE remains stable at the level increased by 150 rpm.

This control is continued until the time started in step S231 counts, for example, 1 second (step S235). After an elapsed time of 1 second, the idling speed in the D-range is returned to the ordinary level (600 rpm) in step S236, followed by the ordinary ISC control. When conditions are met, the idling speed feedback control is resumed.

In the manner described above, a temporary increase in the idling speed at the time of a sudden deceleration is achieved so that an engine stall is avoided and a smooth operation is continued.

Incidentally, if the air/fuel ratio temporarily-enriching means 117 is actuated as the engine speed compensating means 115, operations are performed following the flow charts shown in FIGS. 6 and 8.

It is to be noted that steps S321 to S328 in FIG. 6 perform similar operations to steps S221 to S228 in the same drawing and steps S329 to S333 in FIG. 8 execute similar operations to steps S229 to S233 in FIG. 7.

In steps S334 to S336, operations by the air/fuel ratio temporarily-enriching means 117 are performed.

Described specifically, the amount of fuel injected from the injector 8 is increased by a control signal from ECU 75 in step S334, so that the air/fuel ratio is enriched, for example, by 10% or so relative to an ordinary value. Namely, while controlling by the air/fuel ratio control means 114 the feeding of fuel by the injector 8 as fuel feeding means, the amount of inducted air is increased by a predetermined amount to increase the engine output.

As a result, the engine is ensured to stably rotate so that any substantial drop in the engine speed NE is prevented.

This control is continued until the time started in step 331 counts 1 second (step S335). Upon an elapsed time of 1 second, the air/fuel ratio is returned to the ordinary value in step S336, followed by the ordinary engine control. When conditions are met, the idling speed feedback control is resumed.

In the manner described above, a temporary increase in the idling speed at the time of a significant drop in the engine speed NE is achieved so that an engine stall is avoided and a smooth operation is continued.

As has been described above, the control by the engine speed compensating means 115 can be conducted by either the control performed by actuating the idling speed temporarily-increasing means 116 or the control executed by actuating the air/fuel ratio temporarily-enriching means 117. In this embodiment, however, they are both actuated. Namely, after the routine has reached step S233 (S333), the operations of steps S234 to S236 and those of steps S334 to S336 are performed in parallel in this embodiment.

By temporarily increasing the engine speed NE as needed as described above, the capacity of the oil pump is increased so that a release pressure sufficient to release the direct connection of the damper clutch 28 is assured.

Release of the direct connection of the damper clutch 28 upon sudden braking on a low μ road can therefore be performed promptly. It is hence possible to avoid such a situation that when release of the direct connection is delayed, the engine speed NE is lowered due to braking on the side of the driving wheels and the engine is stalled.

If the release of the direct connection of the damper clutch 28 and the shift control are performed at the same time, the delivery rate of the oil pump becomes insufficient, resulting in insufficient hydraulic pressures available for the release and the control, respectively. Since the engine speed NE is also temporarily compensated by the engine speed compensating means in such a case, the oil pump can produce a sufficient delivery rate. As a result, the engine can be prevented without failure from being stalled even upon sudden braking.

Incidentally, instead of the determination as to whether or not the set value A is 220 rpm in step S230 of FIG. 7 or in step S330 of FIG. 8, it is possible to perform determination as to whether the engine is in such a decelerated state that the rate of change dNE/dt of the engine speed NE is greater than the predetermined value −b1 (b1: constant, b1>a1>0). If YES, the operations of steps S231, S233, S234, S235 and S236 (or steps S331, S333, S334, S335 and S336) can then be conducted.

What is claimed is:

1. A control method of an engine for a vehicle, said engine being arranged in association with a fluid coupling having a clutch, comprising the following steps:

detecting the state of engagement of said clutch;

determining whether or not the vehicle is in a predetermined decelerated operation state; and increasing an output of said engine when said clutch has been detected to be in a predetermined state of engagement in the clutch engagement state detection step and said vehicle has been determined to be in said predetermined decelerated operation state in said decelerated operation state determination step.

2. A control method according to claim 1, wherein in the decelerated operation state determination step, said vehicle is determined to be in said predetermined decelerated operation state when the rate of a change in the revolution speed of said engine is not greater than a predetermined value.

3. A control method according to claim 1, wherein said engine is provided with means for controlling the amount of air to be inducted; and said engine output increasing step comprises the step of increasing the amount of air, which is to be inducted, by a predetermined value by said inducted air amount control means.

4. A control method according to claim 3, wherein said inducted air amount control means is means for controlling an idling speed of said engine.

5. A control method according to claim 1, wherein subsequent to said output increasing step, said control method further comprises the following steps:

counting time to determine whether or not a predetermined time has elapsed since detection of said predetermined decelerated operation state; and stopping said increase in said output of said engine when an elapse of said predetermined time has been detected in said time counting step.

6. A control method according to claim 1, wherein said engine is provided with means for controlling an air/fuel ratio; and said engine output increasing step comprises the step of enriching the air/fuel ratio for said engine by said air/fuel ratio controlling means.

7. A control method according to claim 6, wherein said air/fuel ratio control means is means for feeding fuel to said engine.

* * * * *